US012227359B1

(12) United States Patent
Campbell et al.

(10) Patent No.: US 12,227,359 B1
(45) Date of Patent: *Feb. 18, 2025

(54) LOGISTIC MANAGEMENT SYSTEM FOR SORTING PACKAGES

(71) Applicant: Amazon Technologies, Inc., Seattle, WA (US)

(72) Inventors: Stephen T. Campbell, Waban, MA (US); Ryan Clarke, Haverhill, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,988

(22) Filed: Mar. 24, 2022

Related U.S. Application Data

(63) Continuation of application No. 16/582,345, filed on Sep. 25, 2019, now Pat. No. 11,319,152.

(51) Int. Cl.
*B65G 1/137* (2006.01)

(52) U.S. Cl.
CPC ................................ *B65G 1/1375* (2013.01)

(58) Field of Classification Search
CPC ..................................................... B65G 1/1375
See application file for complete search history.

(56) References Cited

U.S. PATENT DOCUMENTS

| | | | | |
|---|---|---|---|---|
| 8,311,902 B2* | 11/2012 | Mountz | ............ | G06Q 10/0875 700/226 |
| 8,805,573 B2* | 8/2014 | Brunner | ............... | B65G 1/1373 700/214 |
| 8,965,562 B1* | 2/2015 | Wurman | ................ | B25J 9/1602 700/214 |
| 8,983,647 B1* | 3/2015 | Dwarakanath | ....... | G05D 1/0217 700/216 |
| 9,002,506 B1* | 4/2015 | Agarwal | .............. | G06Q 10/087 700/218 |
| 9,008,827 B1* | 4/2015 | Dwarakanath | .......... | F25B 27/00 700/214 |
| 9,111,251 B1* | 8/2015 | Brazeau | ............... | B65G 1/1373 |
| 9,519,882 B2* | 12/2016 | Galluzzo | ............. | G05D 1/0088 |
| 9,733,646 B1* | 8/2017 | Nusser | ................... | B65G 1/137 |
| 10,026,044 B1* | 7/2018 | Wurman | ................ | G06Q 10/08 |

(Continued)

OTHER PUBLICATIONS

Office Action for U.S. Appl. No. 16/582,345, mailed on Jun. 24, 2021, Campbell, "Logistic Management System for Sorting Packages", 15 pages.

*Primary Examiner* — Kyle O Logan
(74) *Attorney, Agent, or Firm* — Lee & Hayes, P.C.

(57) ABSTRACT

A system receives a first indication associated with a first device picking up a package and transmits a first instruction to the first device to travel to a location associated with transferring the package to a second device. The system may transmit a second instruction to the second device to travel to the location to receive the package from the first device. The system receives a second indication associated with the package being transferred from the first device to the second device at the location. One or more third devices may meet at the location to transfer packages to the second device. In some instances, the location may be determined based at least in part on a current location of the first device and/or a current location of the second device.

20 Claims, 9 Drawing Sheets

(56) References Cited

U.S. PATENT DOCUMENTS

| | | | |
|---|---|---|---|
| 10,392,190 B1* | 8/2019 | Theobald | B25J 9/161 |
| 11,319,152 B1* | 5/2022 | Campbell | B65G 1/1375 |
| 2014/0100715 A1* | 4/2014 | Mountz | G06Q 10/087 |
| | | | 701/2 |
| 2014/0100769 A1* | 4/2014 | Wurman | B65G 1/10 |
| | | | 705/22 |
| 2014/0100998 A1* | 4/2014 | Mountz | G06Q 10/08 |
| | | | 705/28 |
| 2014/0100999 A1* | 4/2014 | Mountz | G06Q 10/087 |
| | | | 705/28 |
| 2016/0145044 A1* | 5/2016 | Mountz | B65G 1/1373 |
| | | | 700/216 |
| 2016/0145045 A1* | 5/2016 | Mountz | B65G 1/137 |
| | | | 700/218 |
| 2016/0176638 A1* | 6/2016 | Toebes | G05D 1/0282 |
| | | | 701/25 |
| 2016/0236867 A1* | 8/2016 | Brazeau | B25J 5/007 |
| 2016/0236869 A1* | 8/2016 | Kimura | B65G 1/1378 |
| 2021/0031240 A1* | 2/2021 | Carpenter | B07C 5/362 |

\* cited by examiner

LOGISTIC MANAGEMENT SYSTEM FOR SORTING PACKAGES

CROSS-REFERENCE TO RELATED APPLICATIONS

This application is a continuation of and claims priority to U.S. patent application Ser. No. 16/582,345, filed Sep. 25, 2019, which application incorporates, by reference, U.S. patent application Ser. No. 16/582,344, filed Sep. 25, 2019, now U.S. Pat. No. 11,084,666, issued Aug. 10, 2021, entitled "Robotic Override Units for Hybrid Sortation Systems and Methods."

BACKGROUND

The development of e-commerce has brought an increase in order fulfillment, shipping, and distribution. To handle the increase, retailers may employ systems of conveyor belts and/or chutes. For example, retailers may utilize conveyors to carry packages between locations within warehouses. After filling an order, conveyor belts may deliver the packages to bins or containers based on their shipping address. In some instances, warehouses may include multiple floors, or mezzanines, for sorting packages into their respective containers. Such systems and methods, however, require significant infrastructure costs, are often inefficient, and/or provide little to no scalability.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
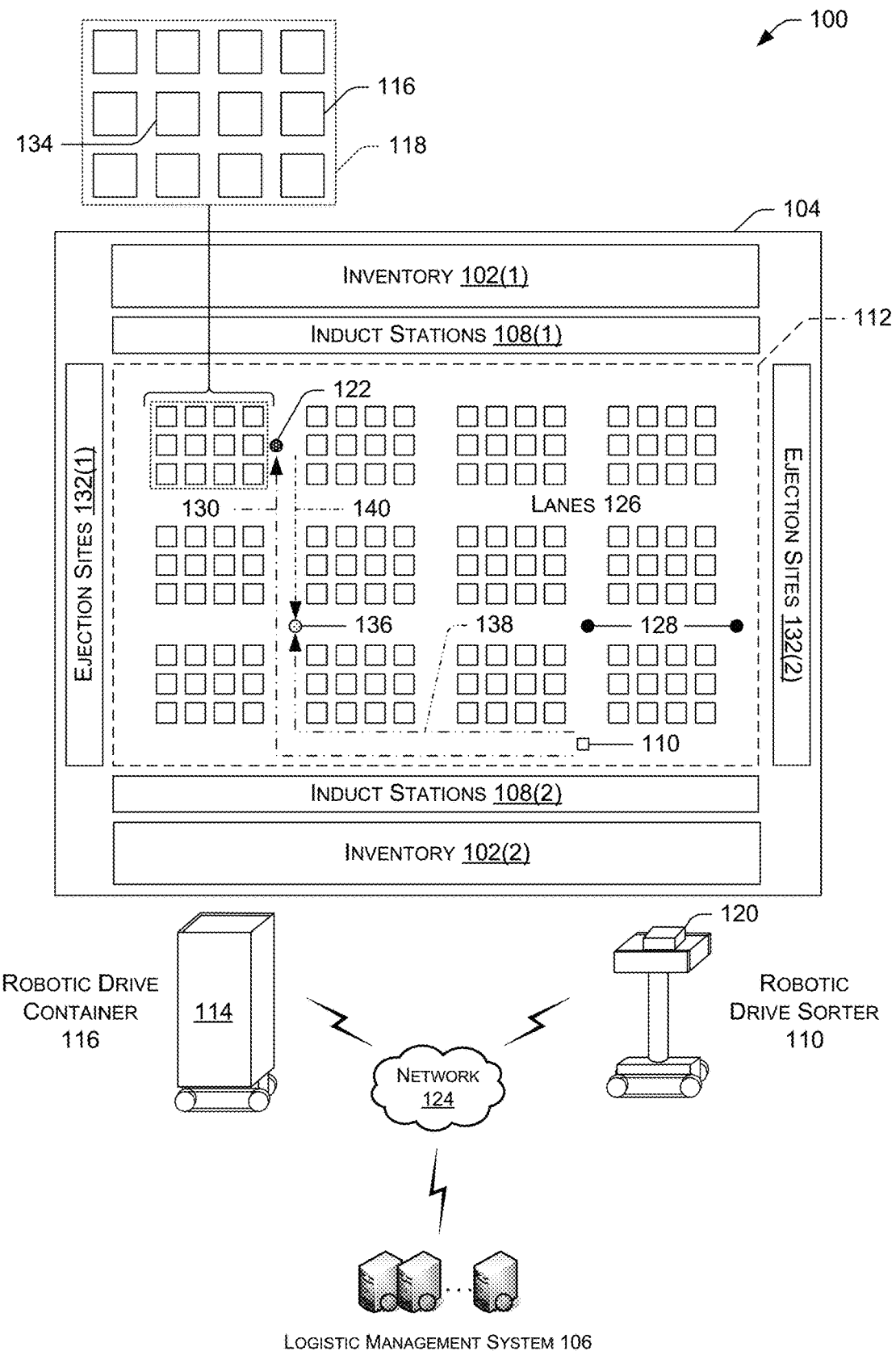
FIG. 1 illustrates an example environment including first robotic devices and second robotic devices, according to an embodiment of the present disclosure. Within the environment, the first robotic devices may receive packages and transfer the packages to the second robotic devices. In some instances, the second robotic devices may be organized into groups and/or locations within the environment.

Discussed herein are systems and methods for sorting packages and/or sorting containers of packages within an environment, such as a sortation center. In some instances, the systems and methods discussed herein may utilize a system or network of moveable devices, such as robotic devices, to sort the packages. For example, the systems and methods may employ different types of robotic devices, such as robotic drive sorters and/or robotic drive containers, for sorting packages. Within the sortation center, the robotic drive sorters and/or robotic drive containers may travel within designated lanes or aisles. For example, the robotic drive sorters may receive packages and deliver the packages to the robotic drive containers. The robotic drive containers may include containers within which packages are placed and according to their destination address. Knowing the location of the robotic drive containers within the sortation center allows the robotic drive sorters to travel to the robotic drive containers and transfer the package to the containers. In some instances, the robotic drive sorters and the robotic drive containers may meet at an intermediate location to reduce a travel distance and/or a travel time of the robotic drive sorter. As the containers become full (e.g., a threshold weight, a threshold volume, a threshold number of items/packages, etc.), the robotic drive containers may deliver the containers to an ejection site where the container (and the packages) are dropped off for shipping and/or distribution to a different location.

Initially, upon receiving an order, the order may be processed and fulfilled by a retailer, e-commerce merchant, distributor, supplier, or other provider. Personnel may locate or pick item(s) by pulling the item(s) off shelves, out of bins, etc. The items may then travel, whether by a conveyor system or by personnel, to a packaging station. At the packaging stations, the item(s) are packaged into packages (e.g., boxes, bags, envelopes, etc.). In some instances, portions of this process may be performed by automated machines (e.g., robots) that locate the item(s), pick the items, and/or package the item(s). After packaging at an initial facility (e.g., a fulfillment center), the packages may move through multiple follow-on processes at the same facility, or at additional facilities. For example, in many instances, packages may be processed at induct stations within a sortation center. At the induct stations, personnel or automated machines may place the package onto a robotic drive sorter. For example, the robotic drive sorter may include a platform, crate, or holder within which the package is placed. In some instances, the order may be processed and fulfilled at a location or environment separate from the sortation center and then transported or otherwise delivered to the sortation center. However, in some instances, the orders may be processed, fulfilled, and sorted within the same environment, or different locations within the same environment.

After receiving the package, the robotic drive sorter may deliver the package to a particular robotic drive container within the sortation center. The packages may be sorted into containers for convenient and efficient shipping. In some instances, each of the robotic drive containers may be assigned or associated with a destination address and/or multiple destination addresses. For example, each of the robotic drive containers may be associated with multiple downstream destination addresses. Based on the destination address of the package, the robotic drive sorter may deliver the package to a corresponding robotic drive container. In some instances, the robotic drive sorter may receive instructions associated with the robotic drive container in which the robotic drive sorter is to deliver the package. For example, a logistic management system may control and/or monitor the robotic drive sorters and/or robotic drive containers within the sortation center.

In some instances, the sortation center may include a system of markers (e.g., fiducial marker) utilized by the robotic drive sorters to locate the robotic drive containers. For example, after receiving an indication of the robotic drive container to which the robotic drive sorter is to deliver the package, the robotic drive sorter may utilize the markers to move about and travel within the sortation center. However, the robotic drive sorter may include a location component (e.g., GPS) used to maneuver about the sortation center. Upon arriving at the container, the robotic drive sorter may transfer the package into the container. For example, the robotic drive sorter may include a lift, tilt mechanism, or arm that places or otherwise transfers the package into the container. After transferring the package, the robotic drive sorter may return to an induct station, whether the same or a different induct station, to receive another package. The robotic drive sorter may therein receive another package and deliver the package to a corresponding container (or robotic drive container).

The robotic drive containers may drive or otherwise transport the containers to ejection sites within the sortation center (e.g., delivery bay). For example, as the containers become full (e.g., threshold weight, threshold volume, threshold number of items/packages, etc.), the robotic drive containers may deliver the container to the ejection sites, which in some instances, may be located on a periphery or perimeter of the sortation center. In some instances, the robotic drive containers may utilize the markers to locate a particular ejection site. For example, as each container may be associated with a destination address (or multiple destination addresses), the robotic drive container may deliver the container to a corresponding ejection site. At the ejection site, the container may be dropped off for shipping to the destination address. The robotic drive container may then pick up another container for receiving additional packages.

In some instances, the containers may be associated with static locations within the sortation center. For example, after dropping off the container, the robotic drive container may return to the same location in the sortation center for receiving additional packages for the destination address. Additionally, or alternatively, the containers may be mapped or assigned to different locations within the sortation center. In such instances, after dropping off a container, the robotic drive container may receive instructions for a new or different location in the sortation center in which to travel to. The robotic drive containers may therefore be assigned locations throughout the sortation center on an as-needed or dynamic basis.

For example, at a first instance, the robotic drive container may be assigned to a first location in the sortation center associated with a first destination address (e.g., Louisville, KY). After dropping off the container, the robotic drive container may be assigned to a second location within the sortation center and/or a second destination address (e.g., Memphis, TN). However, in some instances, the destination address associated with the locations may be updated (e.g., the first location may be assigned to Memphis, TN). With this dynamic assignment, the robotic drive sorters and/or the robotic drive containers may constantly and continuously receive indications from the logistic management system of their associated location to permit the transferring of packages.

In some instances, the containers (or the robotic drive containers) may be organized into groups, clusters, batches, bundles, or other arrays within the sortation center. The groups may comprise any number of containers. For example, containers may be arranged into a 3×3 grid within the group. However, the groups may include any number of containers (e.g., 2×3, 4×4, 3×4, 5×2, etc.). Between the groups, the sortation center may include lanes within which the robotic drive sorters and the robotic drive containers travel. For example, the robotic drive sorters may travel within the lanes to deliver packages to the robotic drive containers and the robotic drive containers may travel within the lanes to deliver containers to the ejection sites. In some instances, the system of markers may be placed in the lanes for use by the robotic drive sorters and the robotic drive containers.

In some instances, being as the containers may be arranged into a grid, certain containers may be located within an interior of the group. For example, containers may be located along a perimeter of the group or within a middle (e.g., a 3×3 group). To allow transferring of packages to the central container, in some instances, the robotic drive container within the center may navigate around or between other robotic drive containers in the group. In some instances, the robotic drive containers may communicate with one another (or via the logistic management system) to move within the group and receive the package. Upon moving to the periphery of the group, the robotic drive container may receive the package. In some instances, the robotic drive containers within the group may dynamically move to position high-volume containers (or containers that receive a large number of packages) on the perimeter, while positioning low-volume containers (or containers that receive less packages as the high-volume containers) on the interior. Such positioning may be updated as packages are delivered to the containers within a group.

Additionally, or alternatively, in some instances, robotic arms may be located at each group or certain groups within the sortation center. The robotic arms may be utilized for placing packages within containers that are located at the center or interior to the periphery of the group. In such instances, the robotic arm may alleviate the need for reshuffling or repositioning. Furthermore, for heavier, larger, and/or fragile packages, the robotic arm may be utilized for placing packages into the containers. For example, rather than the robotic drive sorter transferring the package into the container, for heavier or fragile packages, the robotic arm may remove the package from the robotic drive sorter and place the package into the container.

In some instances, the robotic drive sorters and the robotic drive containers may meet at a centralized or intermediate location within the sortation center. The intermediate location may reduce an amount of time the robotic drive sorters spend traveling to the container. For example, rather than the robotic drive sorter traveling an entire distance to the container, the robotic drive container may move the container to the intermediate location. In some instances, the logistic management system may determine the intermediate location and provide an indication of the intermediate location to the robotic drive sorter and the robotic drive container. At the intermediate location, the robotic drive sorter may transfer the package to the container. Accordingly, in some instances, both the robotic drive sorter and the robotic drive container may move about the sortation center to transfer and receive packages, respectively.

In light of the above, this application discusses a system or network of robotic drives to sort packages. In some instances, a sortation center may employ a network of robotic drive sorters and robotic drive containers for sorting a plurality of packages. The robotic drive sorters and/or the robotic drive containers may include interfaces to communicate with one another directly and/or indirectly via the logistic management system. Such communication may allow the robotic drive sorters and/or the robotic drive containers to navigate around one another within the sortation center and locate one another. Additionally, such system of robotic drives may eliminate or reduce the need for conveyor belts and/or mezzanine levels. The systems and methods discussed herein may also dynamically scale on an as needed basis to handle increased and/or decreased sortation loads. For example, the robotic drive sorters and the robotic drive containers may meet at intermediate locations during peak hours to accommodate for increased sortation.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 according the embodiments of the present disclosure. In some instances, the environment 100 may correspond to a sortation center in which packages are sorted or otherwise categorized for shipment. For example, the sortation center may correspond to a location in which packages are sorted for delivery to a variety of destinations. In some instances, the environment 100 may therefore include, or represent, induction centers, air gateways, air hubs, delivery centers, cross-docking centers, distribution centers, handling facilities, processing facilities, or other environments in which packages are sorted for delivery and/or distribution to multiple locations. In some instances, the environment 100 may additionally or alternatively represent facilities or centers in which orders are fulfilled, packaged, and/or shipped. For example, the environment may include inventory 102(1) and inventory 102(2) located on a floor 104 within the environment 100. Generally, the inventory 102(1) and/or the inventory 102(2) store an inventory of items. In some instances, the items (e.g., clothing, electronics, toys, household goods, etc.) may be stored in bins, slots, shelves, containers, crates, stalls, racks, etc. Although the inventory 102(1) and/or the inventory 102(2) are shown at certain locations within the environment 100, the inventory 102(1) and/or the inventory 102(2) may be located elsewhere within the environment 100 and/or separate from the environment 100. Furthermore, in some instances, the environment 100 may not include the inventory 102(1) and/or the inventory 102(1), such as in a sortation center. Here, the sortation center may receive previously packaged items for further sortation to a variety of destinations.

In some instances, the environment 100 may include a logistic management system 106 for receiving, managing, packaging, fulfilling, and/or shipping packages. For example, in instances where the environment includes the inventory, as orders are placed for items the logistic management system 106 may provide instructions to personnel to locate the items within the inventory 102(1) and/or the inventory 102(2). Additionally, or alternatively, automated machines, such as robots, may receive instructions from the logistic management system 106 for locating the items within the inventory 102(1) and/or the inventory 102(2). The personnel, and/or the robots, may pick the items from the inventory 102(1) and/or the inventory 102(2). After packaging the items, whether manually or autonomously, the packages may arrive at induct stations 108(1) and/or induct stations 108(2). In some instances, whether the packages are manually or autonomously packaged may be based on a weight, number, dimensions, volume, etc. of the package (or item(s)). In some instances, the packaging stations at which the items are placed into boxes, envelopes, bags, or other parcels for shipment may be located adjacent to the induct stations 108(1) and/or the induct stations 108(2). Alternatively, in some instances, the induct stations 108(1) and/or the induct stations 108(2) may include or represent the packaging stations where the orders are packed. After packaging, in some instances, the environment 100 may include conveyors and/or chutes for transporting the items to the induct stations 108(1) and/or induct stations 108(2).

At the induct stations 108(1) and/or the induct stations 108(2) the packages may be placed on a moveable or robotic device for sortation within the environment 100. For example, the environment 100 may include a plurality of robotic drive sorters 110 for transporting and sorting packages within the environment 100 (singularly referred to herein as "the robotic drive sorter 110"). In some instances, the induct stations 108(1) and/or induct stations 108(2) may include manual induct stations and/or automated induct stations whereby the packages are placed onto the robotic drive sorters 110. For example, personnel may manually place the packages onto the robotic drive sorters 110 and/or robots may autonomously place the packages onto the robotic drive sorters 110. In some instances, the induct stations 108(1) and/or the induct stations 108(2) may include any number of separate, discrete, or individual induct stations for transferring the packages to the robotic drive sorters 110.

The robotic drive sorters 110 may include a drive unit or mechanism (e.g., wheels, tracks, etc.) and may transport packages within the environment 100 to deliver packages to drop off locations (e.g., sort points, sort locations, etc.). At the drop off locations, the robotic drive sorter 110 may drop off the packages. In some instances, the logistic management system 106 may coordinate the transportation or movement of the packages to the drop off locations. For example, the robotic drive sorters 110 may receive instructions from the logistic management system 106 regarding the drop off locations and upon receiving the instructions, the robotic drive sorters 110 may travel to the drop off location.

In some instances, the robotic drive sorters 110 may drop off (or otherwise place) the packages into containers. The containers 114 may be utilized to sort packages for convenient and efficient shipping to their destination address and/or between sortation facilities. For example, as shown in FIG. 1, the floor 104 may include a field 112 within which the robotic drive sorters 110 navigate. In some instances, the induct stations 108(1) and/or the induct stations 108(2) may be disposed around a portion of the field 112. The field 112 may include a plurality of containers 114 that receive packages (singularly referred to herein as "the container 114") from the robotic drive sorters 110. In some instances, the robotic drive containers 116 may be located in a grid or groups 118.

In some instances, the containers 114 may include bags, cartons, and/or other containers into which packages are placed, for transport or otherwise. In some instances, the containers 114 may be located on a moveable or robotic device. For example, the environment 100 may include a plurality of robotic drive containers 116 that position the containers 114 for receiving packages from the robotic drive sorters 110 (singularly referred to herein as "the robotic drive container 110"). Individual robotic drive containers 116 may include or support respective containers 114 for receiving packages from the robotic drive sorters 110. For example, as shown in FIG. 1, the environment 100 may include the robotic drive container 116 including or having the container 114 capable of receiving packages from the robotic drive sorters 110.

In some instances, the containers 114 may each be associated with a destination address. Additionally, or alternatively, the containers 114 may be associated with multiple destination addresses to permit downstream sorting at subsequent facilities. By assigning destination addresses to the containers 114, packages destined for the same or geographically proximate addresses may be placed into like containers 114. The logistic management system 106 may utilize the destination address of the packages for sorting the packages into certain containers 114 located with the field 112. By way of example, containers 114 may be assigned destination addresses such as Jacksonville, FL, Seattle, WA, and Syracuse, NY. Packages intended for Syracuse, NY, for instance, may be placed into a container 114 assigned to Syracuse, NY. In some instances, the field 112 may include multiple containers 114 assigned to the same destination address as certain destinations may have a large volume of packages.

To further illustrate, at an induct station, a package 120 may be placed on the robotic drive sorter 110. In some instances, the package 120 may be placed onto the robotic drive sorter 110 after being packaged at a packaging station, for example, in environments that include the inventory 102(1) and/or the inventory 102(2). In other instances, in environments that do not include the inventory 102(1) and/or the inventory 102(2), the package 120 may arrive at the induct station after being received from one or more upstream sortation centers or other sortation locations. In some instances, the robotic drive sorter 110 may include a bin, crate, or other area configured to receive the package 120. The logistic management system 106 may provide the robotic drive sorter 110 with instructions as to which robotic drive container 116 within the field 112 the robotic drive sorter 110 is to transfer (or deliver) the package 120. The logistic management system 106 may therefore utilize the containers 114 as a way to sort packages based on their destination address. For example, the package 120 may be destined for Syracuse, NY and the logistic management system 106 may determine which robotic drive container 116 includes a container 114 associated with Syracuse, NY. The logistic management system 106 may therein transmit an instruction to the robotic drive sorter 110 to transfer the package 120 to the container 114. However, as noted above, the container 114 associated with Syracuse, NY may also receive packages intended for suburbs or adjacent municipals, towns, cities, and so forth around a geographical region of Syracuse, NY. Here, after the container 114 is shipped to Syracuse, NY, further sortation may take place within a sortation center in Syracuse, NY to deliver and/or sort the packages to their respective destination addresses (for example, using the techniques discussed herein). As such, the container 114 associated with Syracuse, NY may receive packages intended for multiple destination addresses.

As part of this process, the logistic management system 106 may provide, or the robotic drive sorter 110 may determine, a drop off location 122 associated within the location of the container 114. As shown, and in some instances, the drop off location 122 may correspond to a location adjacent to, or next to, the container 114. In some instances, the logistic management system 106 may communicate with the robotic drive sorter 110 via a network 124 to provide instructions for moving to traveling to the container 114. The network 124 may represent any type of communication network, including a data network, and may be implemented using wired infrastructure (e.g., cable, CAT5, fiber optic cable, etc.), a wireless infrastructure (e.g., RF, cellular, microwave, satellite, Bluetooth, etc.), and/or other connection protocols.

The robotic drive sorter 110 may utilize aisles, pathways, or lanes 126 within the field 112 or on the floor 104 for delivering the package 120 to the container 114. In some instances, the lanes 126 may not be affixed to the floor 104, but may, be lights projected onto the floor 104 within which the robotic drive sorters 110 and robotic drive containers 116 travel. As shown in FIG. 1, in some instances, the lanes 126 may include lanes that extend in multiple directions within the field 112. In some instances, the robotic drive sorter 110 may move within the lanes 126 to the drop off location 122.

The field 112 may include markers 128 (e.g., infrared markers, QR codes, barcodes, identifiers, etc.) utilized by the robotic drive sorter 110 to locate or otherwise travel to the container 114 (or the drop off location 122). In some instances, the markers 128 may be located within the lanes 126, at corners of intersecting lanes 126, at corners of the groups 118, and so forth. The robotic drive sorter 110 may include an image capturing device (e.g., scanner, camera, etc.) that images the markers 128 to determine a current location of the robotic drive sorter 110 and/or a path to the drop off location 122. Noted above, the logistic management system 106 may provide the robotic drive sorter 110 with an indication of the drop off location 122 (or the container 114). Herein, the robotic drive sorter 110 may utilize the markers 128 for locating the drop off location 122 and/or navigating to the drop off location 122. For example, the robotic drive sorter 110 may travel along a path 130, imaging the markers 128 along the way, to arrive at the drop off location 122. In some instances, however, the robotic drive sorter 110 may travel within the environment 100 without utilizing the markers 128. For example, the robotic drive sorters 110 may receive an indication of a location of the container and utilize an onboard position or locating system to locate and travel to the container 114.

Upon arriving at the drop off location 122, the robotic drive sorter 110 may transfer the package 120 to the container 114. In some instances, the robotic drive sorter 110 may include a conveyor belt, arm, tilt mechanism, or other transfer mechanism that transfers the package 120 to the container 114. After transferring the package 120, the robotic drive sorter 110 may return to the induct stations 108(1) and/or the induct stations 108(2) to receive additional packages for transferring to the containers 114 within the field 112. In some instances, the logistic management system 106 may instruct the robotic drive sorter 110 as to the next induct station the robotic drive sorter 110 is to travel to and receive another package. The logistic management system 106 may also transmit an indication of an inbound robotic drive sorter 110 that will be transferring the package to the container 120.

As the robotic drive sorters 110 transfer packages to the containers 114, the containers 114 may become full (e.g., above a threshold). The robotic drive containers 116 may include sensors to determine when the containers 114 become full or otherwise need to eject or drop off packages. For example, the robotic drive container 116 may include a weight sensor or imaging sensor that determines the container 114 is full. In such instances, the robotic drive container 116 may deliver the packages to ejection sites 132(1) and/or ejections sites 132(2) located around at least a portion of the periphery of the field 112. For example, the robotic drive containers 116 may include a drive unit (e.g., wheels, track, etc.).

In some instances, the logistic management system 106 may instruct the robotic drive container 116 to deliver the container 114 to the ejection sites 132(1) and/or the ejections sites 132(2). For example, upon becoming full, the robotic drive container 116 may transmit an indication to the logistic management system 106. In response, the logistic management system 106 may instruct the robotic drive container 116 to deliver the container 114 to a particular location (e.g., ejection site) within the ejection sites 132(1) and/or ejections sites 132(2). At the ejection sites 132(1) and/or ejections sites 132(2) the containers 114 and/or the packages with the containers 114 may be loaded onto a delivery truck for shipping, for example. In some instances, however, the robotic drive containers 116 may travel to ejection sites located outside the environment 100 and/or locations outside the floor 104. In this sense, the robotic drive containers 116 may travel outside the floor 104 and/or outside the field 112 to additional ejection sites other than the ejection sites 132(1) and/or the ejection sites 132(2). In such instances, the robotic drive containers 116 may utilize onboard components for traveling outside the field 112 and/or receive instructions from the logistic management system 106. Furthermore, the robotic drive containers 116 may be configured to eject the container 114 onto multiple shipping platforms (e.g., pallet, delivery truck, delivery trailer, etc.)

Upon dropping off the container 114 and/or the packages, the robotic drive container 116 may receive a new container (e.g., either manually or autonomously). The robotic drive container 116 may then return to a previously assigned location within the field 112. Alternatively, in some instances, the robotic drive container 116 may travel to or be assigned a new location within the field 112 and/or may travel to other locations within or outside the field 112. The robotic drive containers 116 may therefore either statically map to certain locations within the field 112 or may dynamically map to locations within the field 112. For example, upon a robotic drive container 116 moving to the ejection sites 132(1) or the ejection sites 132(2), another robotic drive container 116 may replace a location previously occupied by the departed robotic drive container 116 in order to fill the void within the field 112. In some instances, the logistic management system 106 may control such assignment to prevent empty voids within the field 112. Moreover, in some instances, the field 112 may include multiple containers assigned to the same destination address. The duplication of certain addresses may reduce an amount of time the robotic drive sorters 110 travel to the robotic drive containers 116. Additionally, having multiple containers for the same destination address may provide an alternative sort point (or drop off location) if a certain container within the field 112 is full and/or removed.

In some instances, the field 112 may include groups 118 of containers 114 (or robotic drive containers 116). In some instances, the groups 118 may comprise grids (or blocks) of containers 114. For example, as shown in FIG. 1, the groups 118 may include 3×4 groupings of containers 114. However, the groups 118 may include a different arrangement of groups 118 and/or the groups 118 may include a different number of containers 114 arranged in other patterns (e.g., hexagonal, circular, etc.). In some instances, the groups 118 may help organize the containers 114 within the field 112. The logistic management system 106 may manage a fleet or network of robotic drive containers 116 arranged in the groups 118. For example, the logistic management system 106 may dynamically assign the robotic drive containers 116 to locations or groups 118 within the field 112. In some instances, awaiting or extra robotic drive containers 116 may be located on a perimeter of the field 112 and/or elsewhere within the environment 100. When containers 114 become full, or the robotic drive containers 116 transfer the containers 114 to the ejection sites 132(1) or the ejection sites 132(2), the logistic management system 106 may order stand-by or awaiting robotic drive containers 116 to replace the departed robotic drive container 116 within the field 112.

In some instances, the groups 118 or locations within the field 112 may include robotic arms and/or other pickers for transferring the package 120 to the container 114. Certain packages, for example, may be too large, heavy, and/or fragile for the robotic drive sorter 110 to transfer. Additionally, or alternatively, given the composition of the groups 118, containers may be located interior to a periphery of the group 118. In some instances, for example, the robotic drive sorters 110 may be unable to transfer packages to the containers 114. For example, within the group 118, a container 134 may be located within the center. In some instances, the container 134 may be unreachable by the robotic drive sorter 110, vice versa. In such instances, the robotic arms may transfer packages to the container 134. Additionally, or alternatively, other robotic drive containers 116 may reposition within the group 118 and/or the field 112 to permit the container 134 to travel to the periphery of the group 118. The robotic drive containers 116 may also move outside the periphery of the group 118, within the group 118, and/or within the lanes 126. In such instances, the robotic drive containers 116 within the group 118 may communicatively couple to one another to reposition and/or the logistic management system 106 may instruct the robotic drive containers 116 to reposition. After receiving packages, the robotic drive containers 116 may reorganize to their previously-assigned arrangement and/or a different arrangement. In other instances, however, the logistic management system 106 may route the robotic drive sorter 110 to another container 114 located within the field 112 that is located on a periphery of the group 118 so as to eliminate the need for reshuffling of the robotic drive containers 116 within the field.

In some instances, the groups 118 within the field may be organized based on a number or volume of packages received. For example, containers 114 associated with a high-volume destination addresses may be located on the periphery of the group 118 while a lower-volume destination address may be located within an interior of the group 118.

Such positioning may reduce the amount of reshuffling of the robotic drive containers 116 within the group 118 and/or reduce the amount of time to transfer the package 120. Additionally, or alternatively, within the field 112 the containers 114 associated with high-volume destination addresses may be separated or spaced apart from one another to reduce congestion to certain areas. For example, containers 114 associated with destination addresses such as New York City and Chicago may be spaced apart within the field 112 to reduce a congestion of robotic drive sorters 110 around such containers 114.

Additionally, or alternatively, low-volume containers may be grouped into larger groups while high-volume containers may be grouped into smaller groups (e.g., 2×2) to potentially reduce the rearrangement or repositioning of the robotic drive containers 116. In a 2×2 grouping, for instance, each of the high-volume containers may be located on a periphery of the group and provide the robotic drive sorters 110 with access to the containers 114 and without the reshuffling of robotic drive containers 116 within the group.

In some instances, the robotic drive containers 116 may be configured to move to receive packages from the robotic drive sorters 110 at locations other than where the robotic drive containers 116 are stationed on the floor 104. For example, rather than the robotic drive sorters 110 traveling an entire distance to the drop off location 122, the robotic drive container 116 may meet the robotic drive sorter 110 at an intermediate drop off location for receiving the package 120. For example, as illustrated in FIG. 1, within the field 112, the robotic drive sorter 110 and the robotic drive container 116 may meet at an intermediate drop off location 136. The robotic drive sorter 110, after receiving the package 120, may travel along a path 138 to the intermediate drop off location 136, while the robotic drive container 116 may travel along a path 140 to the intermediate drop off location 136. At the intermediate drop off location 136, the robotic drive sorter 110 may transfer the package 120 to the container 114, as discussed above. The intermediate drop off location 136 may also serve a drop off location for other robotic drive sorters 110 transferring packages to the container 114. In this sense, more than one robotic drive sorter 110 may meet at the intermediate drop off location 136. Additionally, in some instances, the intermediate location may be located outside the field 112 and/or at other locations within the environment 100.

The intermediate drop off location 136 may be determined based on the location of one or more robotic drive sorters 110 and the robotic drive container 116. In some instances, the intermediate drop off location 136 may be a centrally located position between the robotic drive sorter 110 and the robotic drive container 116. For example, after determining the container 114 to which the package is to be transferred, the logistic management system 106 may determine the intermediate drop off location 136 based on the location of the robotic drive sorter 110 and the robotic drive container 116. For example, the logistic management system 106 may receive an indication associated with a location of the robotic drive sorter 110 and/or the robotic drive container 116 to calculate the intermediate location. In some instances, the logistic management system 106 may utilize cameras or other sensors to determine the location of the robotic drive sorter 110 and/or the robotic drive container 116.

In some instances, the intermediate drop off location 136 may be determined based on a least congested path or travel route for the robotic drive sorter 110 and/or the robotic drive container 116. For example, as multiple robotic drive sorters 110 and/or multiple robotic drive containers 116 may be traveling within the field 112, the lanes 126 may become congested. In some instances, the logistic management system 106 may utilize locations or areas outside the field 112 for sorting packages. The logistic management system 106 may determine the current location and/or the traveling locations of the robotic drive sorters 110 and/or the robotic drive containers 116. In some instances, the logistic management system 106 may determine whether a predetermined number of robotic drive sorters 110 and/or robotic drive containers 116 are within a predetermined area or distance from the intermediate location, and if so, may determine a new intermediate location. Such information may be used to determine congested points within the field 112 (or outside the field 112) to route robotic drive sorters 110 and/or robotic drive containers 116 accordingly. In some instances, the logistic management system 106 may determine the intermediate drop off location 136 based on a least congested area within the field 112 and/or based on the locations of other robotic drive sorters 110 and robotic drive containers 116 within the field 112.

The field 112, or the groups 118 within the field 118, may in some instances be arranged based on the containers 114 that receive packages at intermediate locations and/or containers 114 that receive packages at their location within the field 112. For example, some containers 114 may be configured to remain station within the environment 100 and not travel to intermediate locations. These containers may be located on a particular side, section, or area within the field 112 while other containers 114 that travel to intermediate locations may be located on a different side, a different section, or a different area within the field 112. In such instances, the logistic management system 106 may coordinate the sortation of packages based on those robotic drive containers 114 that are configured to travel to receive packages from the robotic drive sorters 110. Additionally, or alternatively, in some instances, based on this arrangement, the logistic management system 106 may determine or assign intermediate locations for one side or particular area of the field 112.

After receiving the package 120, the robotic drive container 116 may return to its assigned position within the field 112. Additionally, or alternatively, the robotic drive container 116 may meet at another intermediate drop off location to receive other packages from other robotic drive sorters 110. The robotic drive container 116 may also travel to locations outside the field while awaiting instructions from the logistic management system 106 as to a next location in which the robotic drive container 116 is to travel.

Occasionally, certain packages may be too large to fit within the container 114. In such instances, the robotic drive sorter 110 may deliver these packages directly to the ejection sites 132(1) and/or the ejection sites 132(2), or other ejections sites located outside the environment 100, the floor 104, and/or the field 112.

Figure 2:
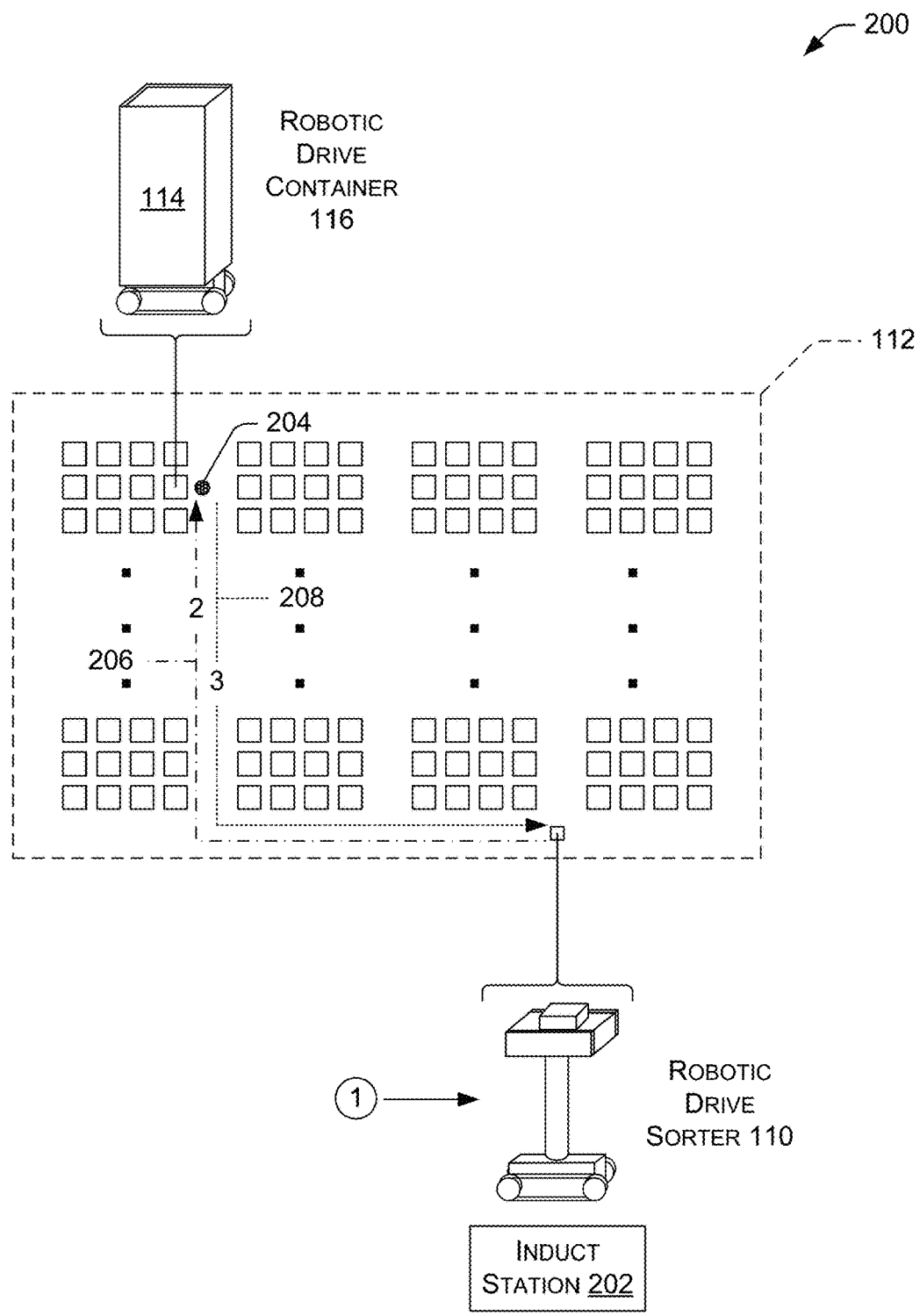
FIG. 2 illustrates an example environment showing a first robotic device transferring a package to a second robotic device, according to an embodiment of the present disclosure.

FIG. 2 illustrates an example environment 200 showing a flow of operations in instances where a robotic drive sorter 110 delivers a package 120 to a robotic drive container 116. As discussed above, the robotic drive sorter 110 may receive the package 120 at the induct stations 108(1) and/or the induct stations 108(2). For example, at "1" the package 120 may be placed onto the robotic drive sorter 110 at an induct station 202 within the induct stations 108(1) or the induct stations 108(2). In instances where the environment 200 corresponds to a facility in which orders are packaged and sorted, the induct station 202 may be located at and/or adjacent to a packaging station and/or inventory (e.g., the inventory 102(1) or the inventory 102(2) in which items are located).

In some instances, the robotic drive sorter 110 may be pre-staged next to the induct stations 108(1) and/or the induct stations 108(2), awaiting an instruction to travel to the induct station 202 to receive the package 120. Additionally, or alternatively, the robotic drive sorter 110 may be within the field 112 or outside the field 112 and travel to the induct station 202 to receive the package 120. In some instances, the logistic management system 106 may instruct the robotic drive sorter 110 to move to the induct station 202 to receive package 120.

At "2" the robotic drive sorter 110 may travel to a robotic drive container 116 located within the field 112. The robotic drive container 116 may include or otherwise support a container 114 associated with a destination address of the package 120. In some instances, the robotic drive sorter 110 may receive instructions from the logistic management system 106 regarding the container 114 that the robotic drive sorter 110 is to deliver the package 120. In some instances, the logistic management system 106 may transmit a location 204 associated with the container 114 and/or the robotic drive container 116. The location 204 may correspond to a location within the field 112 at which the robotic drive sorter 110 travels to transfer the package 120.

As shown, the robotic drive sorter 110, from "1" to "2," may travel along a path 206 to the container 114 (or to the drop off location 204). In some instances, the robotic drive sorter 110 may receive an instruction from the logistic management system 106 regarding the path 206. The robotic drive sorter 110 may utilize the markers 128 to move about the field 112 and travel to the container 114. At the container 114, the robotic drive sorter 110 may transfer the package 120. For example, the robotic drive sorter 110 may include a tilt, conveyor, and/or arm mechanism that transfers the package 120 into the container 114.

After transferring the package 120, at "3" the robotic drive sorter 110 may return to the induct stations 108(1) or the induct stations 108(2), along a path 208. In some instances, the robotic drive sorter 110 may return to the same induct station (e.g., the induct station 202) or a different induct station within the induct stations 108(1) or the induct stations 108(2). Additionally, or alternatively, the robotic drive sorter 110 may navigate to a holding area inside or outside the field 112 while awaiting packages and/or instructions from the logistic management system 106 as to a next package to transfer or sort.

In some instances, the robotic drive sorter 110 may be assigned to a particular area, location, group within the field 112, and/or induct stations. Additionally, or alternatively, in some instances, the robotic drive sorter 110 may deliver more than one package to the container 114 at a time and/or may deliver packages to multiple containers within the field 112 during a single trip.

Figure 3:
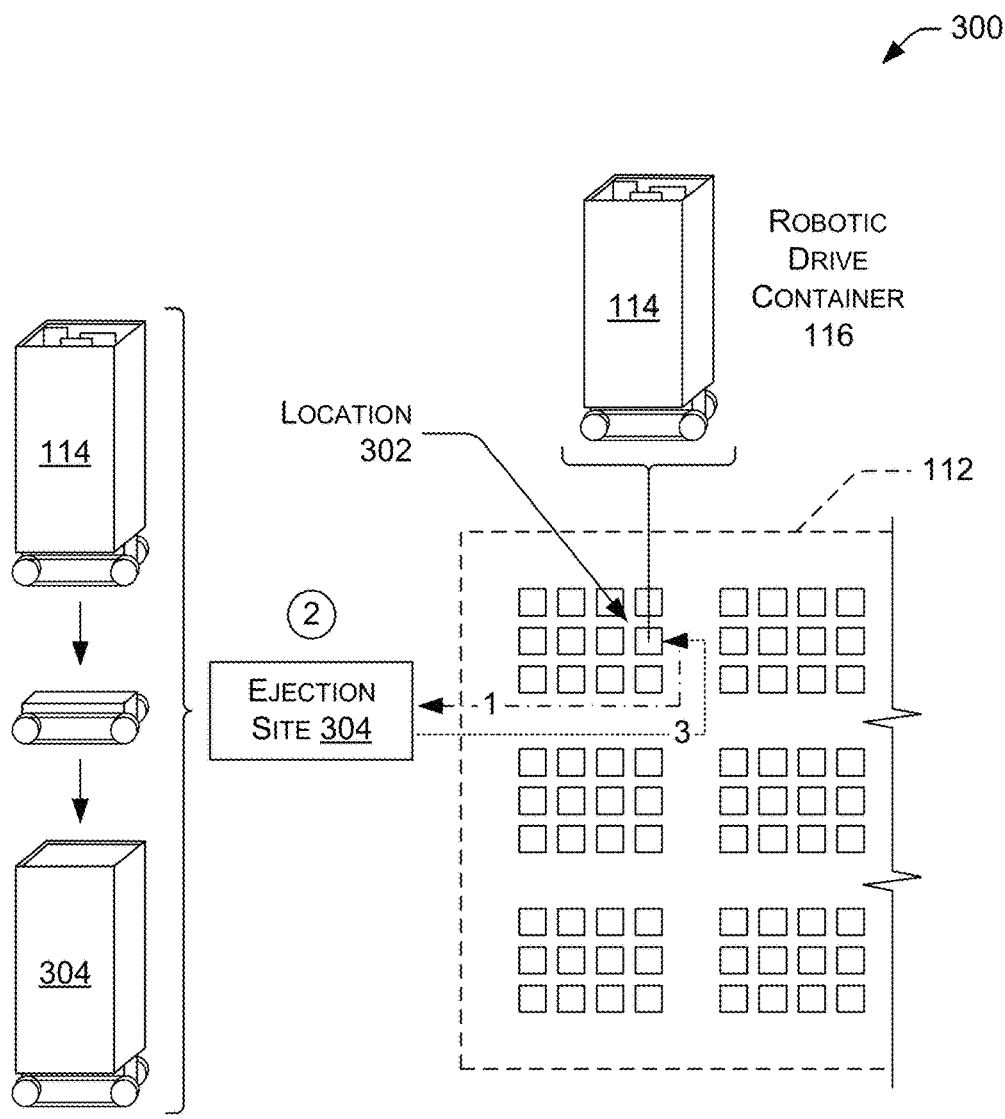
FIG. 3 illustrates an example environment showing a robotic device transferring packages to an ejection site, according to an embodiment of the present disclosure.

FIG. 3 illustrates an example environment 300 showing a flow of operations in instances where a container 114 becomes full and a robotic drive container 116 statically maps to a location within the field 112. As discussed above, the container 114 may continuously receive packages from multiple robotic drive sorters 110. The container 114, or the robotic drive container 116, may include sensors to determine when the container 114 becomes full. Therein, the robotic drive container 116 may move to the ejection sites 132(1) or the ejection sites 132(2). In some instances, the robotic drive container 116 may receive instructions from the logistic management system 106 to move the container 114 to the ejection sites 132(1) or the ejection sites 132(2). As discussed previously, the robotic drive container 116 may utilize the markers 128 to locate the ejection sites 132(1) or the ejection sites 132(2), or otherwise move about the floor 104.

For example, at "1" the robotic drive container 116 may move from a location 302 (e.g., sort points, sort locations, etc.) within the field 112 (or a group) to an ejection site 304. In some instances, the ejection site 304 may represent a specific ejection site (e.g., bay) within the ejection sites 132(1) or the ejection sites 132(2) associated with the destination address of the container 114. However, as discussed herein, the robotic drive container 116 may be configured to travel to other ejection sites that are located outside the environment 100 or outside the floor 104. In this sense, the ejection sites to which the robotic drive container 116 travels may be dynamic and may move depending on the destination address, the packages within the container 114, and/or other characteristics (e.g., congestion within the field 112, sorting locations, and so forth).

As shown, the robotic drive container 116 at "1" may travel along a path to the ejection site 304. In some instances, the robotic drive container 116 may receive an instruction from the logistic management system 106 regarding the path.

At "2" the robotic drive container 116 may eject the container 114 at the ejection site 304. Ejecting the container 114 may include a manual and/or an automated process. After ejecting the container 114, the robotic drive container 116 may receive a new container 304. In some instances, the robotic drive container 116 may receive an instruction from the logistic management system 106 to eject the container 114 upon arriving at the ejection site 304.

At "3" the robotic drive container 116 may travel back to the location 302. At "3" and as shown, the robotic drive container 116 may travel along a path to the location 302. In some instances, the path at "3" may be different than the path at "1". For example, depending on the flow of other robotic drive sorters 110 and/or robotic drive containers 116 within the field 112, the robotic drive container 116 may utilize different paths when dropping off the container 114 and returning to the location 302. In such instances, the logistic management system 106 may determine the route for the robotic drive container 116 to travel along. However, in some instances, the robotic drive container 116 may utilize the same, or a similar path, when traveling between the location 302 and the ejection site 304. Additionally, or alternatively, in some instances, the robotic drive container 116 may travel back to the location 302 autonomously after dropping of the container 114 and receiving a new container 304.

In some instances, FIG. 3 may represent a scenario where each robotic drive container 116 may map to a specific location within the field 112. That is, the robotic drive container 116, after dropping off the container 114, may return to the same location within the field 112 (i.e., the location 302). In this sense, each robotic drive container 116 may be assigned to a particular location within the field 112.

In some instances, while the robotic drive container 116 is gone from the location 302, the logistic management system 106 may reroute robotic drive sorters 110 to other robotic drive containers 116 in the field 112 associated with the same destination address of the container 114. Alternatively, the robotic drive sorters 110 may await adjacent to the location 302 and upon the robotic drive container 116 returning may transfer the packages to the robotic drive container 116.

In some instances, the robotic drive container 116 may be assigned a specific destination address. For example, the robotic drive container 116 may be assigned container(s) destined for Seattle, WA. Additionally, or alternatively, although the robotic drive container 116 may include a designated location on the field 112, the container(s) on the robotic drive container 116 may be associated with different destination addresses (or multiple destination addresses). For example, at a first instance, the robotic drive container 116 may include a container that accepts packages destined for Seattle, WA. After ejecting the container 114, the robotic drive container 116 may pick up the new container 304 that accepts packages destined for Boise, ID.

Figure 4:
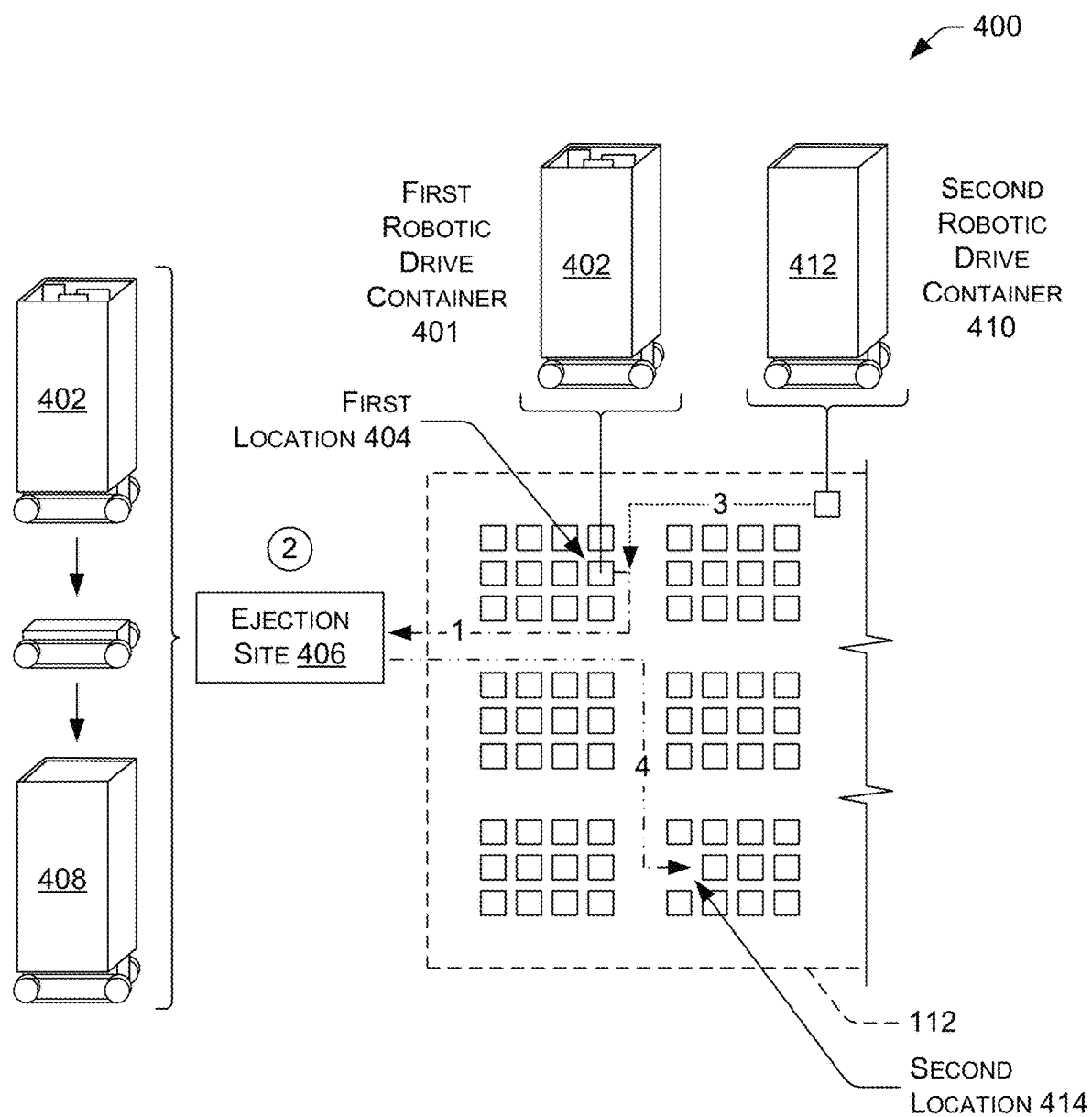
FIG. 4 illustrates an example environment including a first robotic device and a second robotic device, according to an embodiment of the present disclosure. Within the environment, the first robotic device may transfer packages from a first sorting location to an ejection site, while the second robotic device may move to the first sorting location after the first robotic device moves to the ejection site. In some instances, the first robotic device may move to a second sorting location after the first robotic device transfers packages to the ejection site.

FIG. 4 illustrates an example environment 400 showing a flow of operations in instances where a container becomes full and robotic drive containers dynamically map to locations within a field. For example, as shown in FIG. 4, a field 112 may include a first robotic drive container 401 having or supporting a container 402. The first robotic drive container 401 may be located at a first location 404 within the field 112. Upon becoming full, at "1" the first robotic drive container 401 may move an ejection site 406. In some instances, the first robotic drive container 401 may receive instructions from a logistic management system 106 to move to the ejection site 406.

At "2" the first robotic drive container 401 may arrive at the ejection site 406 and eject the container 402. After ejecting the container 402, the first robotic drive container 401 may receive a new container 408. In some instances, the first robotic drive container 401 may receive an instruction from the logistic management system 106 to eject the container 402 upon arriving at the ejection site 406.

FIG. 4 illustrates that a second robotic drive container 410 may replace the first robotic drive container 401. For example, at "3" the second robotic drive container 410 may move to the first location 404 within the field 112. In this sense, the second robotic drive container 410 may replace the first robotic drive container 401 at the first location 404 to prevent voids within the field 112. In some instances, the second robotic drive container 410 may travel from a multitude of areas within the field 112 and/or outside the field 112. For example, the second robotic drive container 410 may travel from a holding or waiting station, the ejection sites 132(1), and/or the ejection sites 132(2). In some instances, a container 412 of the second robotic drive container 410 may be assigned the same or a different destination address as the container 402 or 408 of the first robotic drive container 401. In some instances, upon the first robotic drive container 401 leaving the first location 404, the logistic management system 106 may transmit an instruction to the second robotic drive container 410 to travel to the first location 404. In some instances, the logistic management system 106 may stage robotic drive containers 116 within the field 112 for replacing void locations.

At "4" the first robotic drive container 401 may travel to a second location 414 within the field 112. That is, the first robotic drive container 401 may replace voids left by other robotic drive containers 116 within the field 112. In some instances, the first robotic drive container 401 may receive an instruction from the logistic management system 106 regarding the second location 414 within the field 112 and/or a path to take to travel to the second location 414. In some instances, the first robotic drive container 401 may be reassigned a new destination address associated with shipping packages or may keep a previously assigned destination address.

Alternatively, in some instances, the first robotic drive container 401 may travel to a holding or waiting area while awaiting instructions. In some instances, the holding or waiting area may be within a confine of the field 112 and/or outside the confine of the field 112. For example, in some instances, all locations within the field 112 may be full and the robotic drive container 401 may travel to a holding area while awaiting an assigned location within the field 112. In some instances, the logistic management system 106 may project or determine that a particular robotic drive container within the field 112 is about to move from a location and may instruct the first robotic drive container 401 to travel to the location and await the departure of the robotic drive container. In some instances, FIG. 4 may represent a scenario where the robotic drive containers 116 are dynamically mapped or assigned to locations within the field 112. The logistic management system 106 may therefore utilize a fleet of robotic drive containers 116 to fill voids, or assign locations within the field 112, to prevent downtime or interruptions in the robotic drive sorters 110 transferring packages to the containers 114.

Figure 5:
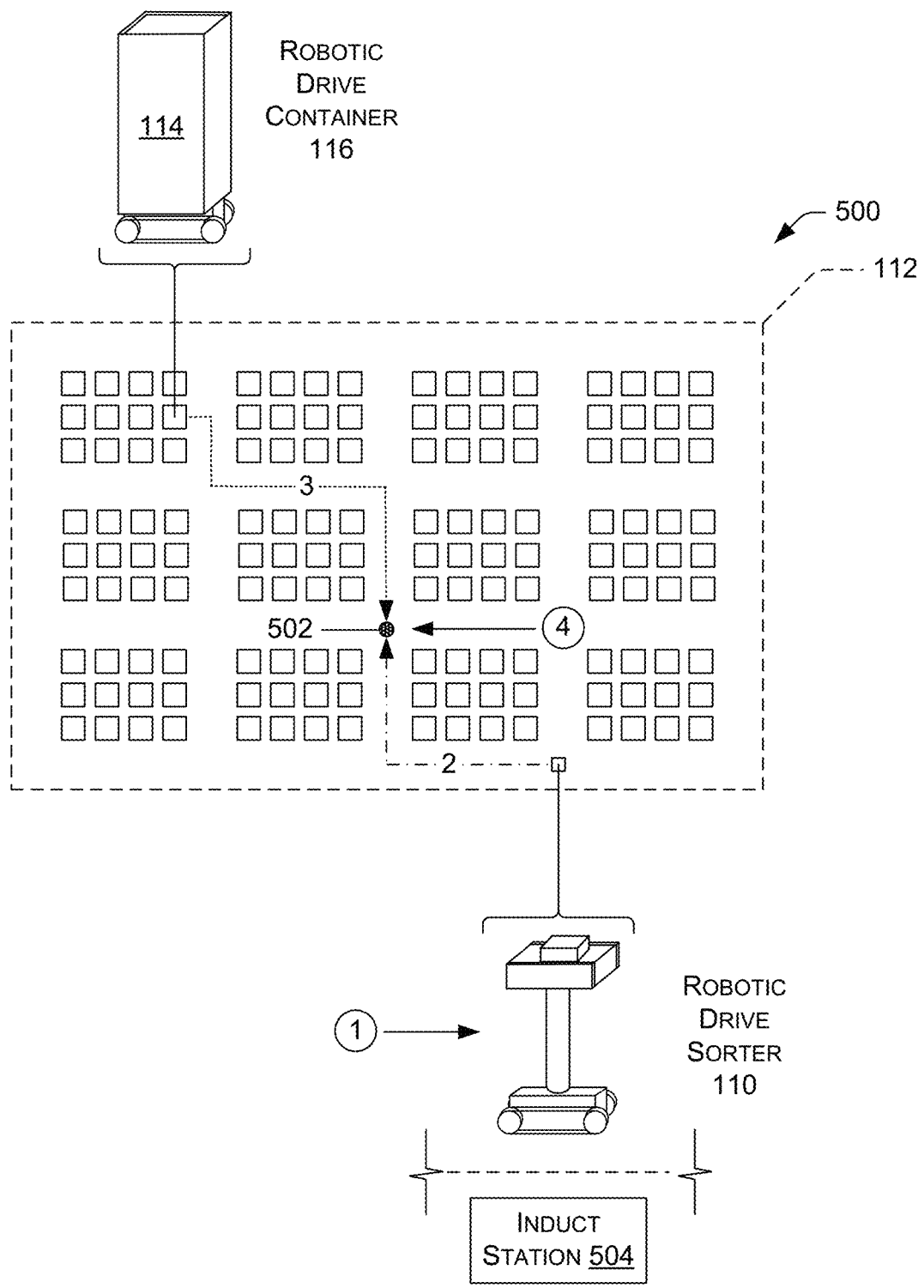
FIG. 5 illustrates a first robotic device and a second robotic device moving to an intermediate location within an environment for sorting packages, according to an embodiment of the present disclosure.

FIG. 5 illustrates an example environment 500 showing a flow of operations in instances where a robotic drive sorter 110 and a robotic drive container 116 meet an intermediate location 502 for sorting packages (e.g., sort points, sort locations, etc.). For example, at "1" the robotic drive sorter 110 may receive a package 120 at a packaging station 504 for delivery to the robotic drive container 116. In some instances, at "2" the robotic drive sorter 110 may travel to the intermediate location 502 and at "3" the robotic drive container 116 may travel to the intermediate location 502. In some instances, the robotic drive sorter 110 and the robotic drive container 116 may travel (or begin traveling) to the intermediate location 502 at substantially the same time or at different times. As shown, in some instances, the robotic drive sorter 110 may travel along a path to the intermediate location 502 and the robotic drive container 116 may travel along a path to the intermediate location 502. The logistic management system 106 may determine the intermediate location 502 and/or instruct the robotic drive sorter 110 and/or the robotic drive container 116 as to the intermediate location 502 and/or paths to take to reach the intermediate location 502.

At "4" the robotic drive sorter 110 may transfer the package 120 to the robotic drive container 116. In some instances, the robotic drive sorter 110 may arrive at the intermediate location 502 before, after, or at substantially the same time as the robotic drive container 116, vice versa. After transferring the package 120, the robotic drive sorter 110 may deliver another package, return to the induct stations 108(1), return to the induct stations 108(2), or travel to other locations on the floor 104 and/or within the field 112 (e.g., holding station). After receiving the package 120, the robotic drive container 116 may travel to another intermediate location to receive additional packages, return to an assigned location within the field 112, travel to a new assigned location within the field 112, and/or travel to the ejection stations 132(1) or the ejection stations 132(2).

Although the above discussion relates to the robotic drive container 116 receiving packages from a single robotic drive sorter 110, in some instances, the robotic drive container 116 may receive packages from multiple robotic drive sorters (e.g., two, three, etc.) at an intermediate location. For example, the logistic management system 106 may coordinate the transfer of multiple packages from different robotic drive sorters at the intermediate location. Based at least in part on the location of the robotic drive sorter(s) and/or the robotic drive container(s), the logistic management system 106 may determine a suitable intermediate location within the field 112 and/or paths to the intermediate location. As discussed above, in some instances, the intermediate locations may be located on a particular side, zone, or area within the field 112 and/or outside the field 112.

Additionally, in some instances, the packages may be unable to be transferred to the container (e.g., size, weight, fragile, etc.). In such instances, the robotic drive container 116 may reject the intermediate location 502, and instead, the robotic drive sorter 110 may travel to the robotic drive container 116. Therein, a robotic arm may transfer the package 120 to the container 114. Alternatively, within the field 112, a robotic arm located adjacent to the intermediate location 502 may transfer the package 120 from the robotic drive sorter 110 to the container 114.

Although the above discussion relates to the intermediate location being located within the field 112, or stated alternatively, the robotic drive sorter 110 transferring a package to the robotic drive container 116 at a location in the field 112, the intermediate locations may be located outside of the field 112 and/or at other locations within or outside the environment 500. For example, the logistic management system 106 may determine an intermediate location that is outside the field 112. In such instances, the logistic management system 106 may transmit an indication of the intermediate location and the robotic drive sorter 110 and the robotic drive container 116 may travel to the intermediate location. In such instances, the robotic drive sorter 110 and/or the robotic drive container 116 may include components that navigate or allow the robotic drive sorter 110 and/or the robotic drive container 116 to respectively travel outside the field 112. Additionally, or alternatively, the logistic management system 106 may provide the robotic drive sorter 110 and/or the robotic drive container 116 with a path to travel to the intermediate location outside the field 112.

Figure 6:
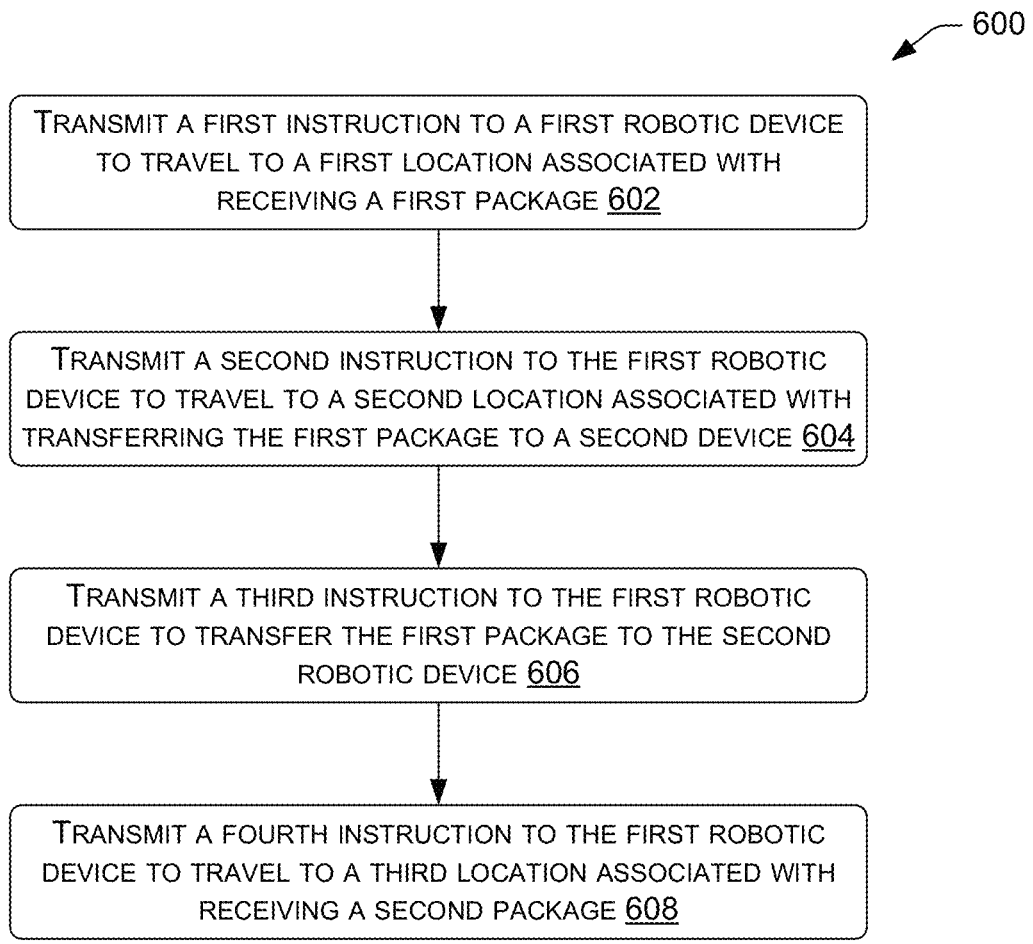
FIG. 6 illustrates an example process for sorting packages, according to an embodiment of the present disclosure.
Figure 7:
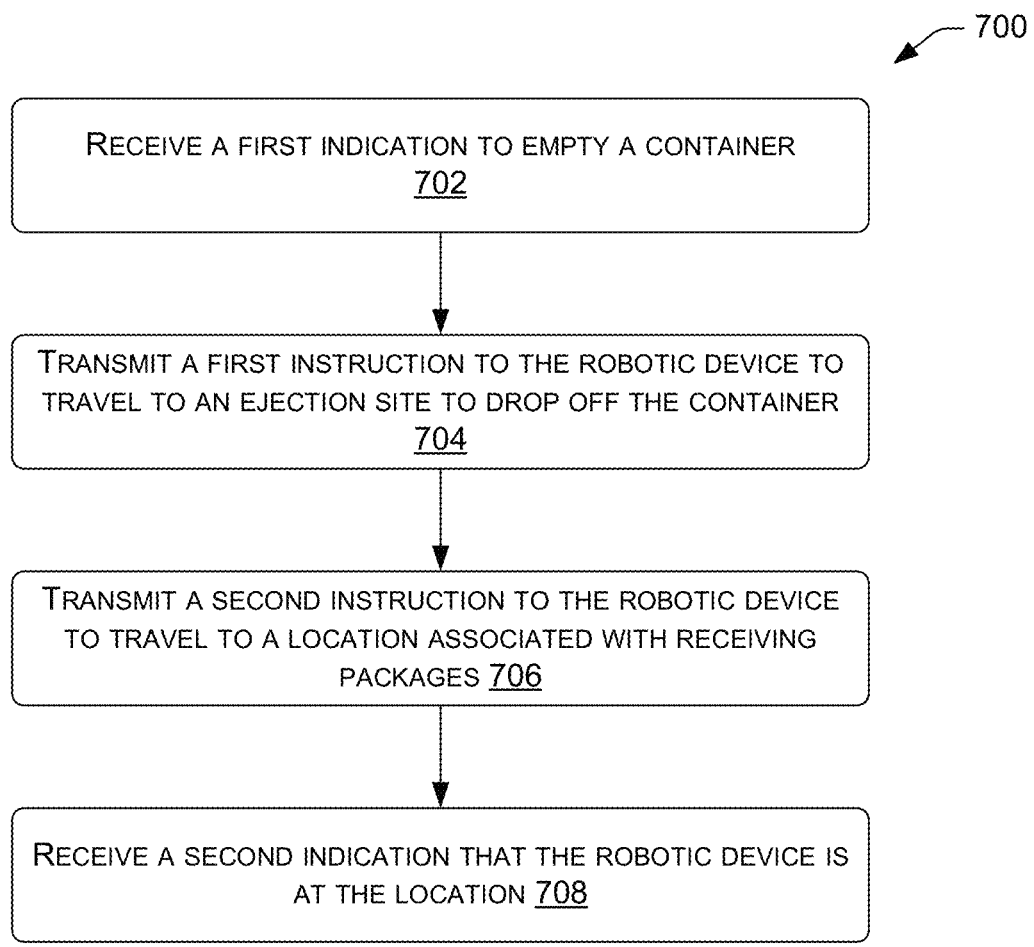
FIG. 7 illustrates an example process for transferring packages to an ejection site, according to an embodiment of the present disclosure.
Figure 8:
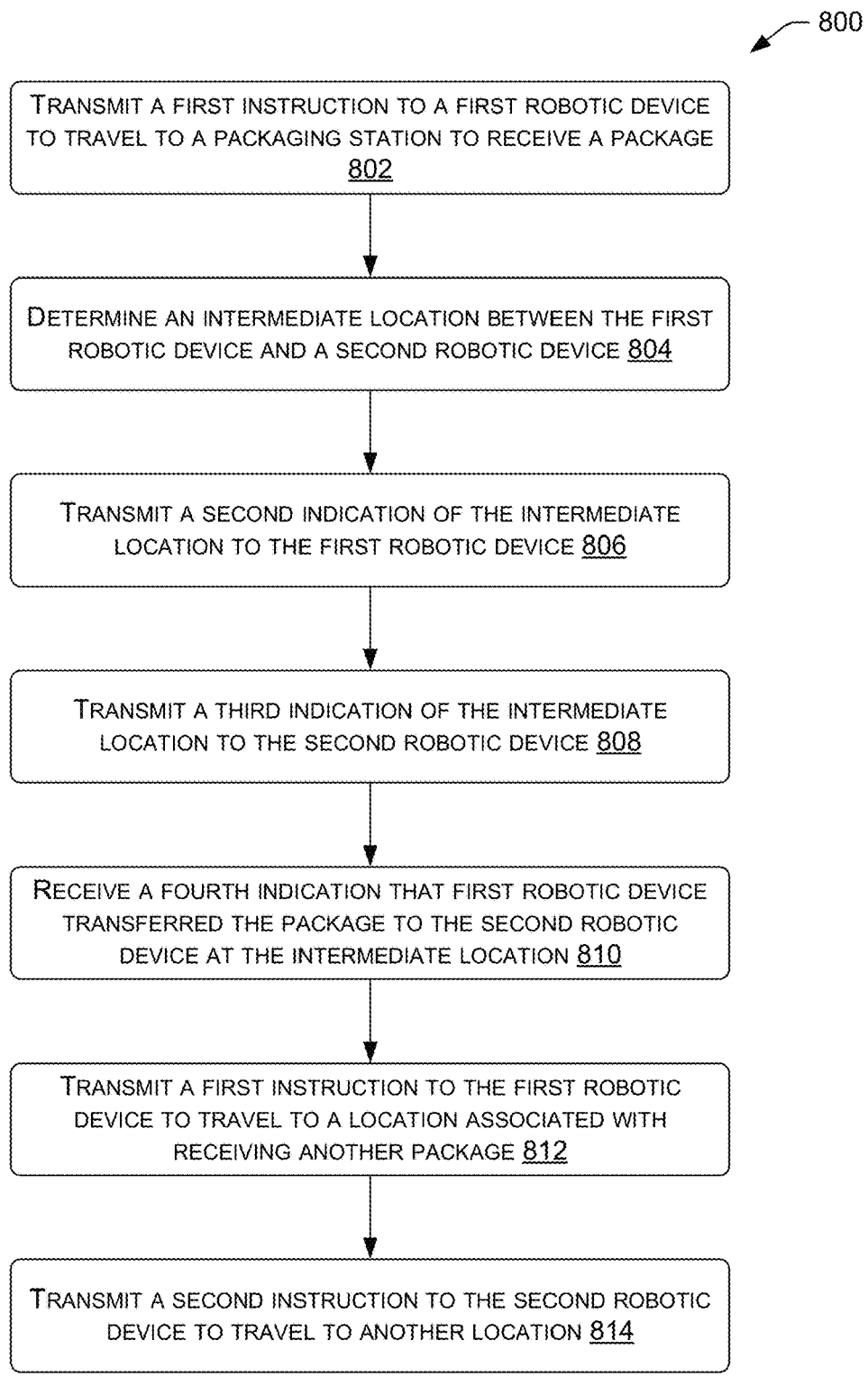
FIG. 8 illustrates an example process sorting packages at an intermediate location, according to an embodiment of the present disclosure.

FIGS. 6-8 illustrate various processes related to sorting packages within an environment. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1-5, although the processes may be implemented in a wide variety of other environments, architectures, and systems.

FIG. 6 illustrates an example process 600 for sorting packages. In some instances, the process 600 may be performed by the logistic management system 106.

At 602, the process 600 may transmit an instruction to a first robotic device to travel to a first location, such as an induct station to pick up or receive a package. In some instances, the induct station may be located adjacent to inventory and/or packaging stations within an environment, and/or may otherwise represent locations where packages are inducted into an environment for sorting packages. The logistic management system 106 may transmit an instruction to a robotic drive sorter 110 to travel to an induct station to pick up or receive a package 120 (e.g., the induct stations 108(1) or the induct stations 108(2)). In some instances, the logistic management system 106 may transmit an indication of a location and/or path along which the robotic drive sorter 110 is to travel. Using the markers 128, the robotic drive sorter 110 may travel to the induct station. However, in some instances, the robotic drive sorter 110 may utilize alternate ways to travel to the induct station, such as onboard location components or instructions received from the logistic management system 106.

At 604, the process 600 may transmit an instruction to the first robotic device to travel to a second location associated with transferring the package to a second robotic device. For example, the logistic management system 106 may transmit an instruction to the robotic drive sorter 110 to travel to a robotic drive container 116. In some instances, the process 600 may receive an indication that the robotic drive sorter 110 received the package 120, and therein, may transmit the instruction to travel to the robotic drive container 116. In some instances, the logistic management system 106 may transmit an indication to the robotic drive container 116 indicating the arrival of the inbound robotic drive sorter 110 and/or may transmit an indication at which the robotic drive sorter 110 is to transfer the package 120 to the robotic drive container 116

The logistic management system 106 may determine the robotic drive container 116 among a plurality of other robotic drive containers within the field 112 based at least in part on a destination address of the package 120. For example, knowing the destination address of the package 120, the logistic management system 106 may select a corresponding robotic drive container. The logistic management system 106 may therein transmit an instruction to the robotic drive sorter 110 to travel to the robotic drive container 116 (or a location of the robotic drive container 116). In some instances, the process 600 may also provide a path used by the robotic drive sorter 110 to travel to the robotic drive container 116. The path may include a least congested or least trafficked path or area based on the location of other robotic drive sorters 110 and/or robotic drive containers 116 within the field 112.

In some instances, as part of coordinating the transfer of the package to the robotic drive container 116, the logistic management system 106 may instruct the robotic drive container to travel to a periphery of the group or readjusted within the group to receive the package 120. As part of this process the logistic management system 106 may instruct other robotic drive containers 116 to reshuffle or reposition.

At 606, the process 600 may transmit an instruction to the first robotic device to transfer the package to the second robotic device. For example, the logistic management system 106 may transmit an indication to the robotic drive sorter 110 to transfer the package 120 to a container 114 of the robotic drive container 116 or a container supported on or by the robotic drive container 116. In some instances, the logistic management system 106 may receive an indication that the robotic drive sorter 110 arrived at the robotic drive container 116, and in response, may transmit the instruction to transfer the package 120. However, in some instances, the robotic drive sorter 110 may autonomously transfer the package 120 upon arriving at the container 114 (or the drop off location) and without receiving an instruction from the logistic management system 106.

At 608, after transferring the package, the process 600 may transmit an instruction to the first robotic device to travel to the induct stations. For example, the logistic management system 106 may receive an indication that the robotic drive sorter 110 transferred the package 120 to the container 114, and in response, may instruct the robotic drive sorter 110 to return to induct stations 108(1) or the induct stations 108(2) to receive another package. In some instances, the logistic management system 106 may provide an indication as to a location within the induct stations 108(1) or the induct stations 108(2) the robotic drive sorter 110 is to travel and/or a path to travel along. Accordingly, the robotic drive sorter 110 may receive the other packages for transferring to other robotic drive container (or the robotic drive container 116).

Although the process 600 is discussed with regard to the logistic management system 106 instructing a single robotic drive sorter, the logistic management system 106 may instruct a multitude of robotic drive sorters in parallel or in sequence to deliver respective packages to respective robotic drive containers (e.g., three, six, etc.). For example, the logistic management system 106 may instruct a first robotic drive sorter to deliver a first package to a first robotic drive container and a second robotic drive sorter to deliver a second package to a second robotic drive container. Accordingly, the logistic management system 106 may coordinate the sorting of packages within the field 112 using a fleet or network of robotic drive sorters 110. However, as discussed above, in some instances, the robotic drive sorters 110 may travel to locations outside the field 112 for sorting packages and/or otherwise moving about the environment 100.

Additionally, the process 600 may illustrate an instance where the robotic drive containers 116 remain stationary, while the robotic drive sorters 110 travel to the robotic drive containers 116. In some instances, noted above, the robotic drive containers 116 may be sorted into groups 118 within the field 112 and the robotic drive containers 116 may reshuffle within the field 112 such that the robotic drive container 116 may receive packages. Moreover, in some instances, certain packages may be too heavy, too large, and/or too fragile for directly transferring from the robotic drive sorter 110 to the robotic drive container 116. In some instances, the logistic management system 106 may utilize a robotic arm at a group 118 for transferring the package 120.

In some instances, rather than the logistic management system 106 transmitting separate instructions, in some instances, at the outset, the logistic management system 106 may transmit a single instruction that includes the operations of the process 600. Therein, the robotic drive sorter 110 may autonomously perform the operations based at least in part on the instruction received from the logistic management system 106.

FIG. 7 illustrates an example process 700 for ejecting packages within containers or ejecting containers on robotic drive containers 116. In some instances, the process 700 may be performed by the logistic management system 106.

At 702, the process 700 may receive an indication associated with emptying a container of a robotic device. For example, the logistic management system 106 may receive an indication, from a robotic drive container 116, indicating that a container 114 of the robotic drive container 116 is full. In some instances, the robotic drive container 116 (or the container 114) may include a sensor for determining that the container 114 is full.

At 704, the process 700 may transmit an instruction to the robotic device to travel to an ejection site to drop off or empty packages. For example, the logistic management system 106 may instruct the robotic drive container 116 to travel to an ejection site among the ejection sites 132(1) or the ejection sites 132(2) to empty the container 114, drop off the container 114 (and receive a new, empty, container, etc.), or otherwise drop off the packages within the container 114. In some instances, the logistic management system 106 may transmit the instruction at 704 based at least in part on receiving an indication from the robotic drive container 116 indicating that the container 114 is full. However, in some instances, the logistic management system 106 may otherwise determine that the container 114 is full (e.g., sensors within the field 112).

Additionally, or alternatively, in some instances, the process 700 may instruct the robotic drive container 116 to travel to the ejection site based at least in part on a schedule. For example, delivery trucks at the ejection sites 132(1) and the ejection sites 132(2) may depart at certain times of the day and to ensure that packages are delivered on time, the process 700 may instruct the robotic drive containers 116 to transport their containers to the ejection sites 132(1) and the ejection sites 132(2). As part of instructing the robotic drive containers 116, the logistic management system 106 may provide a location of the ejection site and/or a path to travel along.

At 706, the process 700 may transmit an instruction to the robotic device to return to a location associated with receiving packages. For example, the logistic management system 106 may instruct the robotic drive container 116 to return to a specific location within a field 112. In some instances, the logistic management system 106 may receive an indication that the robotic drive container 116 ejected the container 114, and in response, may instruct the robotic drive container 116 to travel back to the field 112. Before, or after, the robotic drive container 116 may also receive a new container. In some instances, the robotic drive container 116 may return to a previously assigned location within the field 112, may travel to a new location within the field 112, and/or may travel to another location within the field 112, such as a holding station. For example, the robotic drive container 110 may statically or dynamically map to locations within the field 112. In some instances, the logistic management system 106 may also assign the container 114 with a destination address for sorting packages at later instances.

At 708, the process 700 may receive an indication that the robotic device has returned to the field. For example, the logistic management system 106 may receive an indication, or otherwise determine, that the robotic drive container 116 has returned to the field 112. In some instances, the indication may be used by the logistic management system 106 to route the robotic drive sorters 110 to the robotic drive container 116. That is, upon returning to the field 112, the robotic drive container 116 may receive packages destined for the destination address associated with the container 114. For example, the logistic management system 106 may instruct the robotic drive sorters 110 to drop off packages into a container of the robotic drive container 116.

In some instances, the robotic drive containers 116 may be configured to travel to ejection sites that are outside the field 112. The ejection sites to which the robotic drive containers 116 are configured to travel may therefore be located within the field 112 and/or outside the field 112. In such instances, the ejections sites may dynamically change or be determined based on the specifics of the packages within the container 114 (e.g., size, weight, etc.), the specifics of the container 114 (e.g., size, weight, type, etc.), the destination address of the container 114, and so forth.

FIG. 8 illustrates an example process 800 for determining an intermediate location for sorting packages. In some instances, the process 800 may be performed by the logistic management system 106.

At 802, the process 800 may transmit an instruction a first robotic device to travel to an induct station to pick up or receive a package. For example, the logistic management system 106 may transmit, to a robotic drive sorter 110, an instruction to travel to a induct station to pick up or receive a package 120 (e.g., the induct stations 108(1) or the induct stations 108(2)).

At 804, the process 800 may determine an intermediate location associated with a drop off location at which the first robotic device transfers the package to a second robotic device. For example, the logistic management system 106 may determine a location of the robotic drive sorter 110 and a location a robotic drive container 116 to determine a location at which the robotic drive sorter 110 transfers the package 120 to the robotic drive container 116. Discussed above, the logistic management system 106 may determine the robotic drive container 116 among the plurality of robotic drive containers 116 based at least in part on the destination address of the package 120. That is, knowing the destination address of the package 120, the logistic management system 106 may select a corresponding robotic drive container 116 to receive the package 120. In some instances, based on the current locations of the robotic drive sorter 110 and/or the robotic drive container 116, the process 800 may determine the intermediate location. In some instances, the intermediate location may correspond to a centralized location between the robotic drive sorter 110 and the robotic drive container 116. Additionally, or alternatively, the logistic management system 106 may determine the intermediate location based on a least congested location or area within the field 112. In some instances, the intermediate location may be located within a field 112 or outside the field 112 depending on characteristics of the environment 100 (e.g., number of robotic drive sorters 110, number of robotic drive containers 116, size, etc.), characteristics of the package (e.g., size, weight, etc.), characteristics of the container 114 (e.g., type, size, etc.).

At 806 and 808, after determining the intermediate location, the process 800 may transmit indications of the intermediate location to the first robotic device and/or the second robotic device. For example, the logistic management system 106 may transmit an indication of the intermediate location to the robotic drive sorter 110 and/or the robotic drive container 116. In turn, the robotic drive sorter 110 and the robotic drive container 116 may travel to the intermediate location for transferring and receiving the package 120, respectively. In some instances, the intermediate location may correspond to an assigned location within the environment at which the robotic drive container 116 is located. In such instances, the robotic drive container 116 may receive the instruction from the logistic management system 106 and determine that the robotic drive container 116 is already located at the intermediate location. Despite receiving the instructions, in some instances, the robotic drive container 116 may therefore not move to the intermediate location.

At 810, the process 800 may receive an indication that the first robotic device transferred the package and/or that the second robotic device received the package. For example, upon the package 120 being transferred to the robotic drive container 116, the logistic management system 106 may receive an indication from the robotic drive sorter 110 indicating the transfer of the package 120 and/or may receive an indication from the robotic drive container 116 indicating the receipt of the package 120.

At 812, the process 800 may transmit an instruction to the first robotic device to travel to induct stations to receive additional packages for sorting. For example, the logistic management system 106 may instruct the robotic drive sorter 110 to travel to the induct stations 108(1) or the induct stations 108(2) to receive additional packages for sorting or delivering to the robotic drive containers 116. As part of this process, in some instances, the logistic management system 106 may transmit an indication of a path the robotic drive sorter 110 is to travel. The robotic drive sorters 110 may therefore continuously receive packages at the packaging stations 108(1) or the packaging stations 108(2) for transferring to the robotic drive containers 116.

At 814, the process 800 may transmit an instruction to the second robotic device to travel to other intermediate locations, ejections sites, groups, or other locations within or outside the field 112. For example, the logistic management system 106 may transmit an indication of another location within the field 112 where the robotic drive container 116 is to receive another package from other robotic drive sorter(s) 110. Alternatively, the robotic drive container 116 may be instructed to return to an assigned location within the field 112 (or group 118) and/or eject the container 114 at the ejection sites 132(1) or the ejection sites 132(2). In some instances, the logistic management system 106 may also provide the robotic drive container 116 with a path to travel to the determined destination. The logistic management system 106 may also instruct the robotic drive containers 116 to travel to locations outside the field 112 to eject containers or to holding areas (or outside a structured field or system of markers).

Accordingly, the process 800 may illustrate an environment for dynamically moving robotic drive sorters 110 and robotic drive containers 116 for transferring and receiving packages. The logistic management system 106 may coordinate such transferring and receiving among a plurality of robotic drive sorters 110 and robotic drive containers 116 within the field 112. Such dynamic movement may increase an efficiency and/or speed at which packages are sorted and delivered. Furthermore, in some instances, the logistic management system 106 may determine an intermediate location at which multiple robotic drive containers 116 transfer respective packages to the robotic drive container 116.

Additionally, although the processes 600, 700, and 800 are discussed as separate processes, in some instances, the process 600, 700, and/or 800, or the steps thereof, may be combined.

Figure 9:
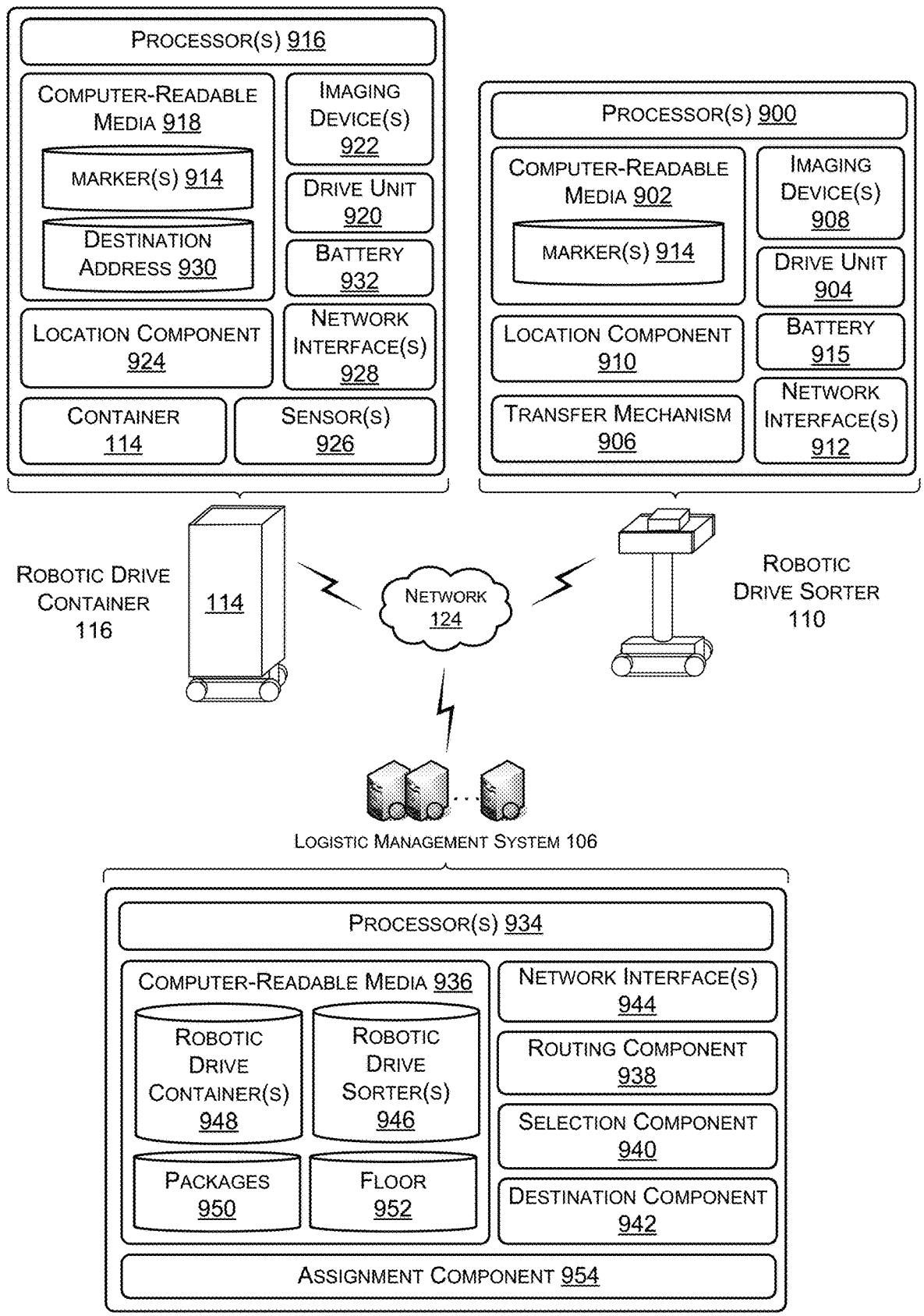
FIG. 9 illustrates example components of robotic devices and a logistic management system, according to an embodiment of the present disclosure.

FIG. 9 illustrates example components of the robotic drive sorter 110, the robotic drive container 116, and the logistic management system 106.

As illustrated, and in some instances, the robotic drive sorter 110 may include processor(s) 900, computer-readable media 902, a drive unit 904, a transfer mechanism 906, imaging device(s) 908, a location component 910, and/or network interface(s) 912. The processor(s) 900 may perform various functions or operations associated with sorting packages, while the computer-readable media 902 may store instructions executable by the processor(s) 900 to store the operations described herein.

Generally, the robotic drive sorter 110 includes a body to provide structural support as well as an outer encasing for protecting the components of the robotic drive sorter 110.

The robotic drive sorter 110 has the drive unit 904 for moving the robotic drive sorter 110 within a field or an environment. The drive unit 904 is configured to move the robotic drive sorter 110 in response to receiving instructions from the logistic management system 106 and/or as otherwise instructed by the processor(s) 900. In this sense, the drive unit 904 has corresponding electronics to control movement of drive unit 904, which maneuvers the robotic drive sorter 110 within the environment as desired. In some instances, the drive unit 904 may include an orientation component, such as a gyroscope, and a position location component, such as a GPS (global positioning system) unit for traveling and/or moving about the environment.

The drive unit 904 may include a motor or any type of mechanical or electrical engine of sufficient size and power to move the robotic drive sorter 110. In some instances, the drive unit 904 includes a tread mechanism with a track that is mounted on, and rotated by, a set of wheels. In other implementations, the drive unit 904 may be embodied in any number of arrangements, including with wheels, digit members (e.g., leg-type members), a suspended wiring assembly, a drive unit mounted on a track, articulating arm members that move etc. In some instances, the drive unit 904 may facilitate one or more degrees of movement to allow rotation about a vertical axis, rotation about a tilt axis, and rotation about a pan axis. One or more motors may be further included to power the movement about the vertical, tilt, and pan axes.

The robotic drive sorter 110 may include a transfer mechanism 906 for transferring packages to containers 114 on robotic drive containers 116. In some instances, the transfer mechanism 906 may include a conveyor belt, an arm, or a tilt that operates to transfer packages to the containers 114. For example, upon arriving at a drop off or sorting location, the processor(s) 900 may instruct the transfer mechanism 906 to operate and transfer packages. In some instances, a motor of the drive unit 904 (and/or another motor of the robotic drive sorter 110) may power the transfer mechanism 906. Additionally, the transfer mechanism 906 may further include a lift that extends portions of the robotic drive sorter 110 at various heights.

The imaging device(s) 908 may image the marker(s) 128 within the environment to ascertain orientation and/or location. For example, the processor(s) 900 of the robotic drive sorter 110 may receive image data associated with the markers 128 and may compare the image data to a database of marker(s) 914 stored in the computer-readable media 902. The database of marker(s) 914 may maintain, for each maker 128, the position of the marker 128 within the environment. Through this comparison, the processor(s) 900 may determine an orientation and/or location within the environment, which may be utilized by the robotic drive sorter 110 when moving to sorting locations, packaging stations, etc. For example, after determining the orientation and/or location, the processor(s) 900 may cause the drive unit 904 to travel to certain locations or in certain directions within the environment.

Additionally, the robotic drive sorter 110 may include the location component 910, such as a GPS, local beacons, spatial grid systems, triangulation systems, and the like. The location component 910 may be utilized by the logistic management system 106 to track or otherwise determine a location of the robotic drive sorter 110 within the environment. Such information, may be utilized to select robotic drive sorters 110 when picking up packages at the packaging stations and/or otherwise instructing the robotic drive sorters 110 to move about the environment. The location component 910 may also be utilized to identify a location of the robotic drive sorter 110 within the environment and for use when instructing the robotic drive sorter 110 to travel within or outside the environment (or within the field 112). For example, in instances where the robotic drive sorter 110 travels outside the field 112 (or outside the system of markers 128), the location component 910 may provide an indication of a location of the robotic drive sorter 110 for use in traveling to such locations.

The robotic drive sorter 110 further include network interface(s) 912 to communicate with other moveable devices, such as other robotic drive sorters 110, robotic drive containers 116, and/or the logistic management system 106 that coordinates movement of the robotic drive sorters 110 and robotic drive containers 116. For example, robotic drive sorter 110 may communicate with other robotic drive sorters 110, robotic drive containers 116, and/or the logistic management system 106 to send and receive data. The network interface(s) 912 enables access to one or more types of network, including wired and wireless networks. When implemented as a wireless unit, the network interface(s) 912 use an antenna to send and receive wireless signals. In some instances, the robotic drive sorter 110 may communicatively couple to other robotic drive sorters 110, robotic drive containers 116, and/or the logistic management system 106 using one or more communication channel(s), such as Bluetooth (e.g., 802.11), Bluetooth Low Energy (BLE), ZigBee (e.g., 802.15.4), Z-wave, Wi-Fi), or the like. The network interface(s) 912 may enable the robotic drive sorter 11 to communicate over any type of network, such as wireless networks (e.g., Wi-Fi, Bluetooth, Personal Area Networks, Wide Area Networks, and so forth).

A battery 915 is further provided to distribute power to the various components of the robotic drive sorter 110.

As illustrated, and in some instances, the robotic drive container 116 may include processor(s) 916, computer-readable media 918, a drive unit 920, a container 114, imaging device(s) 922, a location component 924, sensor(s) 926, and/or network interface(s) 928. The processor(s) 916 may perform various functions or operations associated with sorting packages, while the computer-readable media 918 may store instructions executable by the processor(s) 916 to store the operations described herein. Generally, the robotic drive container 116 includes a body to provide structural support as well as an outer encasing for protecting the components of the robotic drive container 116. The body may also support or otherwise secure the container 114 to the robotic drive container 116.

The robotic drive container 116 has the drive unit 920 for moving the robotic drive container 116 within a field or an environment. In some instances, the drive unit 920 may be similar to and/or include similar components and/or functionalities as the drive unit 904 of the robotic drive sorter 110. For example, the drive unit 920 may receive directional information from the logistic management system 106 and may move in response to receiving instructions from the logistic management system 106, and/or as otherwise instructed by the processor(s) 916.

The robotic drive container 116 includes the container 114 for receiving packages from the robotic drive sorters 110. In some instances, the container 114 may be detachably coupled to the robotic drive container 116 to drop off the packages at ejections sites and/or to allow the robotic drive container 116 to pick up and receive new containers. The container 114 may include a variety of shapes (e.g., square, cylindrical, etc.), types (e.g., bag, pallet, etc.), sizes, and/or materials (e.g., plastic, fabric, etc.).

The sensor(s) 926 may determine when the container 114 is full (e.g., threshold weight, threshold volume filled, etc.).

In some instances, the sensor(s) 926 may comprise weight sensor(s) and/or imaging sensor(s) that determine when the container 114 is full for purposes of emptying or ejection the container 114.

The imaging device(s) 922 may image the marker(s) 128 within the environment to ascertain orientation and/or location. The computer-readable media 918 may further store the database of markers 128, which may be used to determine an orientation and/or location within the environment. Further, the computer-readable media 918 may store a destination address 930. The destination address 930 may be associated with the destination address of the container 114 for use in sorting packages.

The robotic drive container 116 may include the location component 924, such as a GPS, local beacons, spatial grid systems, triangulation system, and the like. The location component 924 may also be utilized to identify a location of the robotic drive container 116 within the environment and for use when instructing the robotic drive container 116 to travel within or outside the environment (or within the field 112). For example, in instances where the robotic drive container 116 travels outside the field 112 (or outside the system of markers 128), the location component 924 may provide an indication of a location of the robotic container 116 for use in traveling to such locations.

Network interface(s) 928 communicate with other moveable devices, such as other robotic drive sorters 110, robotic drive containers 116, and/or the logistic management system 106. A battery 932 is further provided to distribute power to the various components of the robotic drive sorter 110.

The logistic management system 106 may include processor(s) 934, computer-readable media 936, a routing component 938, a selection component 940, a destination component 942, an assignment component 954, and/or network interface(s) 944. The processor(s) 934 may perform various functions or operations associated with sorting packages, while the computer-readable media 936 may store instructions executable by the processor(s) 934 to store the operations described herein.

As illustrated the computer-readable media 936 may store several database(s), such as a robotic drive sorters database 946, a robotic drive containers database 948, a package database 950, and a floor database 952. The robotic drive sorters database 946 may store information pertaining to the robotic drive sorters 110, such as their location within the environment, their usage, battery life, current status (e.g., awaiting instructions, delivering package, etc.), information, such as identifiers used to communicate with the robotic drive sorters 110, and so forth. The logistic management system 106 may communicatively couple to the robotic drive sorters 110 to receive such information, which in some instances, may be used to update the robotic drive sorters database 946. The logistic management system 106 may therefor utilize the robotic drive sorters database 946 for managing or otherwise instructing the robotic drive sorters 110.

The robotic drive containers database 948 may store information pertaining to the robotic drive containers 116, such as their location within the environment, their usage, their associated destination address, the capacity of the container 114, battery life, current status (e.g., awaiting instructions, receiving package, group, etc.), information, such as identifiers, used to communicate with the robotic drive containers 116, and so forth. The logistic management system 106 may communicatively couple to the robotic drive containers 116 to receive such information, which in some instances, may be used to update the robotic drive containers database 948. The logistic management system 106 may therefore utilize the robotic drive containers database 948 for managing or otherwise instructing the robotic drive sorters 110.

The package database 950 may include information associated with the packages (or orders) to be sorted within the environment. For example, the package database 950 may identify packages that are to be sorted within the environment. The package database 950 may also include information associated with the package, such as the items within the package, the status of an order (e.g., fulfilled, shipped, etc.), identifying information of a user who purchased the items, shipping information (e.g., speed, address, etc.), and so forth. The logistic management system 106 may utilize the package database 950 for performing various operations associated with sorting packages within the environment. For example, knowing the destination of the packages (e.g., addresses), the logistic management system 106 may determine a corresponding container for sorting the package.

The floor database 952 may include information about the environment 100. For example, the floor database 952 may store information associated with locations of the inventory 102(1) and the inventory 102(2), the location of the induct stations 108(1) and the induct stations 108(2), the field 112 (e.g., groups 118), the lanes 126, the markers 128, the location of the ejection sites 132(1) and the ejection sites 132(2), and so forth. Such information may be used by the logistic management system 106 when directing or instructing the robotic drive sorters 110 and/or the robotic drive containers 116 to move about the environment.

The destination component 942 may determine the destination of packages utilizing, for example, the package database 950. The selection component 940 may select robotic drive sorters 110 for transferring packages and/or may select robotic drive containers 116 to receive the packages. In some instances, the selection component 940 may select the robotic drive containers 116, or the containers 114 associated therewith, based at least in part on the address of the packages (i.e., as determined by the destination component 942).

The routing component 938 may determine a paths or routes of the robotic drive sorters 110 and/or the robotic drive containers 116. For example, after determining the container 114 in which the package is to be delivered, the routing component 938 may determine a location of the container 114 within the environment and for use in instructing the robotic drive sorter 110 and/or the robotic drive container 116. The routing component 938 may also determine the paths the robotic drive sorters 110 and/or the robotic drive containers 116 are to move along to transfer packages, eject containers, receive packages, and so forth. For example, after ejecting a container, the routing component 938 may determine a route or location within or outside the field 112 in which the robotic drive container 116 is to travel. For example, using information about the field 112 (e.g., voids), the routing component 938 may instruct the robotic drive container 116 to travel to particular locations to fill voids, for example. Similarly, after transferring a package, the routing component 938 may determine a route for the robotic drive sorter 110 to travel to receive another package. Accordingly, the logistic management system 106 may include components for continuously instructing the robotic drive sorters 110 and the robotic drive containers 116 to sort packages.

The assignment component 954 may assign locations within or outside the field 112 to the robotic drive sorters 110 and/or the robotic drive containers 116. The assignment component 954 may also assign the robotic drive containers 116 to groups within the field 112. For example, the assignment component 954 may determine low-trafficked or high-trafficked containers 114 for use in assigning robotic drive containers 116 to certain groups, or locations within the groups 118. The assignment component 954 may also dynamically change the size of the groups 118, or the arrangement of the robotic drive containers within the groups 118, based on the traffic experienced by the containers 114. For example, the assignment component 954 may position high-trafficked containers 114 on a periphery of a group or may assign high-trafficked containers 114 into smaller groups to limit the potential reshuffling of containers 114 within a particular group.

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving a first indication of a package for delivery to a delivery destination;
determining a sorting location for the package based at least in part on the delivery destination;
transmitting, to a first moveable device, a first instruction to transport the package to the sorting location, wherein at the sorting location, the first moveable device transfers the package into a container associated with the delivery destination;
receiving a second indication indicating that the first moveable device transferred the package to the container;
determining a capacity associated with the container; and
transmitting, to a second moveable device and based at least in part on the capacity, a second instruction to transport the container to an outbound location associated with transporting the package to the delivery destination.

2. The method of claim 1, further comprising:
causing the first moveable device to travel to the sorting location; and
causing the second moveable device to travel to the outbound location.

3. The method of claim 1, further comprising:
receiving a third indication of a second package for delivery to the delivery destination; and
transmitting, to a third moveable device, a third instruction to transport the second package to the sorting location, wherein at the sorting location, the third moveable device transfers the second package into the container associated with the delivery destination.

4. The method of claim 1, further comprising receiving a third indication associated with the container being ready for transport to the outbound location, wherein transmitting the second instruction is based at least in part on receiving the third indication.

5. The method of claim 1, further comprising:
based at least in part on transmitting the second instruction, determining a third moveable device to transport a second container to the sorting location; and
causing the third moveable device to travel to the sorting location to deposit the second container.

6. The method of claim 1, wherein the first moveable device includes at least one of a conveyor, a robotic arm, or a tilt mechanism for transferring the package into the container.

7. A system comprising:
one or more processors; and
one or more non-transitory computer-readable media storing computer-executable instructions that, when executed by the one or more processors, cause the one or more processors to perform acts comprising:
receiving a first indication associated with a package being scanned for delivery to a delivery destination;
determining, within an environment, a sorting location of the package based at least in part on the delivery destination;
causing a first moveable device to transport the package to the sorting location, wherein at the sorting location, the first moveable device directly transfers the package into a container associated with the delivery destination;
determining a fill volume associated with the container;
determining that the fill volume is equal to or greater than a threshold; and
sending, based at least in part on the fill volume being equal to or greater than the threshold, an instruction associated with causing a second moveable device to transport the container to an outbound location associated with transporting the package to the delivery destination.

8. The system of claim 7, the acts further comprising at least one of:
receiving a first indication indicating that the first moveable device received the package; or
receiving a second indication indicating that the package was transferred into the container.

9. The system of claim 7, the acts further comprising:
causing the first moveable device to travel to a location within the environment associated with receiving a second package;
receiving an indication that the first moveable device received the second package; and
causing the first moveable device to transport the second package to a second sorting location, wherein at the second sorting location, the first moveable device directly transfers the second package into a second container.

10. The system of claim 7, wherein the first moveable device includes at least one of a conveyor, a robotic arm, or a tilt mechanism for directly transferring the package into the container.

11. The system of claim 7, the acts further comprising receiving an indication associated with the container being readied for transport to the outbound location, wherein causing the second moveable device to transport the container to the outbound location is based at least in part on receiving the indication.

12. The system of claim 7, the acts further comprising:
receiving an indication associated with the second moveable device transporting the container to the outbound location;
determining a third moveable device to transport a second container to the sorting location; and
causing the third moveable device to transport the second container to the sorting location.

13. The system of claim 7, the acts further comprising:
determining a capacity associated with the container, and
sending, based at least in part on the capacity, the instruction associated with causing the second moveable device to transport the container to the outbound location.

14. A method comprising:
causing a first device to travel to a first location associated with depositing a container;
causing a second device to travel to a second location associated with receiving a package;
causing the second device to transport the package from the second location to the first location, wherein at the first location, the second device is configured to transfer the package into the container;
causing the first device or a third device to travel to the first location; and
causing the first device or the third device to transport the container from the first location to a third location.

15. The method of claim 14, further comprising at least one of:
determining a number of packages transferred into the container;
determining a weight of the packages transferred into the container; or
determining a volume of the packages transferred into the container,
wherein causing the first device or the third device to travel to the first location is based at least in part on the at least one of the number of packages, the weight of the packages, or the volume of the packages.

16. The method of claim 14, further comprising at least one of:
receiving a first indication associated with the second device receiving the package; or
receiving a second indication associated with the package being transferred into the container.

17. The method of claim 14, further comprising causing the second device to travel to the second location or a fourth location to receive a second package.

18. The method of claim 14, further comprising at least one of:
determining a first route for the second device between the second location and the first location; or
determining a second route for the first device or the third device between the first location and the third location.

19. The method of claim 14, further comprising:
receiving an indication associated with the first device or the third device transporting the container to the third location;
determining a fourth device to transport a second container to the first location; and
causing the fourth device to transport the second container to the first location.

20. The method of claim 14, further comprising:
causing a fourth device to travel to the second location or a fourth location associated with receiving a second package;
determining a fifth location associated with sorting the second package; and
causing the fourth device to transport the second package to the fifth location, wherein at the fifth location the fourth device is configured to transfer the package into a second container.

* * * * *